(12) United States Patent
Tsukada

(10) Patent No.: US 9,552,792 B2
(45) Date of Patent: Jan. 24, 2017

(54) IMAGE PROCESSING APPARATUS, IMAGE PROCESSING METHOD, AND PROGRAM FOR CONTROLLING THE DISPLAY OF IMAGE DATA ON A DISPLAY

(71) Applicant: CANON KABUSHIKI KAISHA, Tokyo (JP)

(72) Inventor: Nobuyuki Tsukada, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 14/024,432

(22) Filed: Sep. 11, 2013

(65) Prior Publication Data

US 2014/0085325 A1 Mar. 27, 2014

(30) Foreign Application Priority Data

Sep. 14, 2012 (JP) ................. 2012-203094

(51) Int. Cl.
*G09G 5/00* (2006.01)
*G09G 5/02* (2006.01)
*G06F 3/0482* (2013.01)
*G06F 3/0485* (2013.01)
*G06F 3/0488* (2013.01)
*G09G 5/14* (2006.01)

(52) U.S. Cl.
CPC ............ *G09G 5/006* (2013.01); *G06F 3/0482* (2013.01); *G06F 3/0485* (2013.01); *G06F 3/04886* (2013.01); *G09G 5/02* (2013.01); *G09G 5/14* (2013.01); *G09G 2354/00* (2013.01)

(58) Field of Classification Search
CPC G06F 3/0484; G06F 3/04812; G06F 3/04817; G06F 83/04; G06F 8/38; G06F 9/4443; H04N 21/47205
See application file for complete search history.

(56) References Cited

U.S. PATENT DOCUMENTS 6,348,935 B1 * 2/2002 Malacinski ........... G06F 3/0481
715/840
7,752,573 B2 * 7/2010 Shiba .................. G06F 3/04817
455/566

(Continued)

FOREIGN PATENT DOCUMENTS

JP  H0581322 A  4/1993
JP  2004272314 A  9/2004

(Continued)

*Primary Examiner* — Antonio A Caschera
(74) *Attorney, Agent, or Firm* — Canon U.S.A., Inc. IP Division

(57) ABSTRACT

An apparatus includes a selection unit configured to select an image group from a plurality of image groups based on image information related to image data, and a display control unit configured to control a display to display images based on the plurality of pieces of image data. The display control unit controls the display to display a plurality of images such that images based on the plurality of pieces of image data are arranged in a predetermined order. When the selected image group is displayed, the display control unit controls the display to display images such that images are displayed in a displaying state in which at least one image included in the image group selected by the selection unit is displayed in a manner distinguishable from at least one image that is not included in the selected image group.

21 Claims, 22 Drawing Sheets

(56) References Cited

U.S. PATENT DOCUMENTS

| | | | | |
|---|---|---|---|---|
| 9,141,274 B2* | 9/2015 | Matsunaga | ......... | G06F 3/04817 |
| 2003/0081007 A1* | 5/2003 | Cyr | ....................... | G06F 9/4443 |
| | | | | 715/804 |
| 2007/0076255 A1* | 4/2007 | Hamashima et al. | ....... | 358/1.16 |

FOREIGN PATENT DOCUMENTS

| JP | 2005-119083 A | 5/2005 |
|---|---|---|
| JP | 2010128923 A | 6/2010 |

* cited by examiner

FIG. 8

| LIST NUMBER | FILE NAME | TIME STAMP |
|---|---|---|
| 1 | ¥¥DCIM¥100AAA¥IMG_0001 | 2011/12/01/07:00:02 |
| 2 | ¥¥DCIM¥101AAA¥IMG_0018 | 2012/01/08/08:10:18 |
| 3 | ¥¥DCIM¥102AAA¥IMG_0405 | 2012/02/03/04:12:54 |
| 4 | ¥¥DCIM¥105AAA¥IMG_0251 | 2012/04/01/07:01:32 |
| 5 | ¥¥DCIM¥105AAA¥IMG_0252 | 2012/04/01/07:05:12 |

(PRIOR ART)
FIG. 22
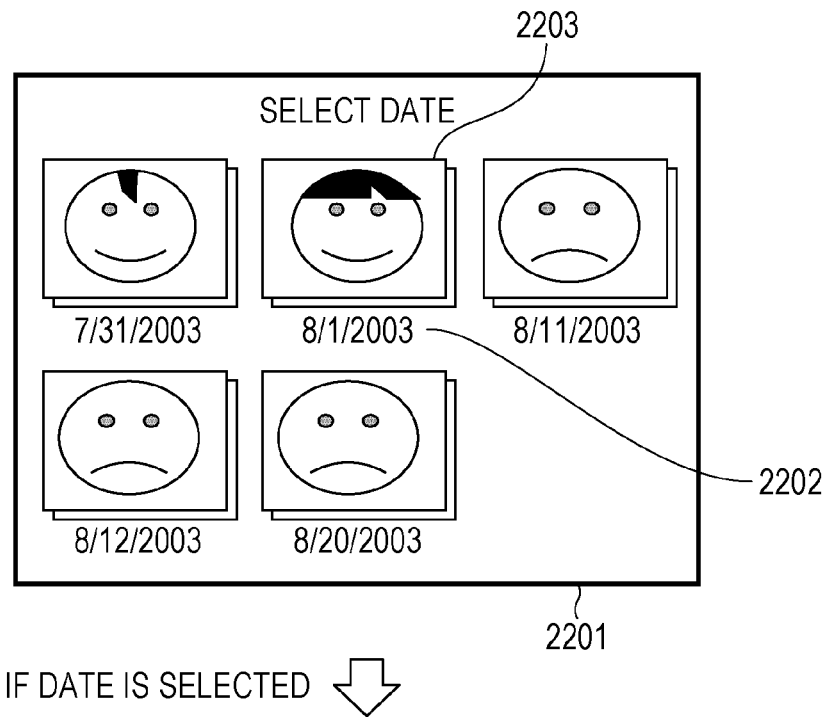
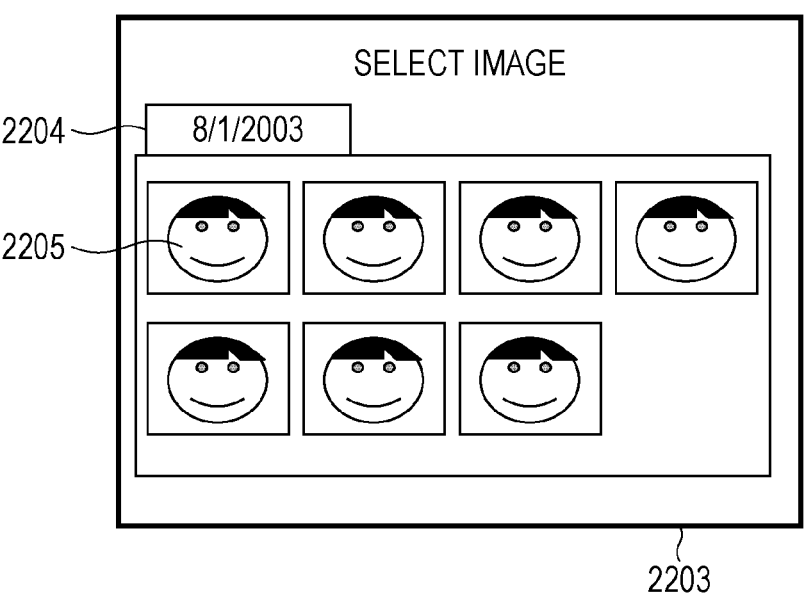

IMAGE PROCESSING APPARATUS, IMAGE PROCESSING METHOD, AND PROGRAM FOR CONTROLLING THE DISPLAY OF IMAGE DATA ON A DISPLAY

BACKGROUND OF THE INVENTION

Field of the Invention

The present invention relates to a display control apparatus and a display control method.

Description of the Related Art

An image processing apparatus is known that has a function of displaying, on a display such as a liquid crystal display, a plurality of pieces of image data stored in a storage medium such as a memory card such that a user is allowed to select a desired image.

Japanese Patent Laid-Open No. 2005-119083 discloses a method in which date folders are displayed separately for each date such that a user is allowed to select a date folder. If a user selects a particular date folder, only a plurality of images based on image data of a date designated by the user are displayed side by side in a display screen. FIG. 22 is a diagram illustrating a display screen of an image processing apparatus disclosed in Japanese Patent Laid-Open No. 2005-119083. In FIG. 22, reference numeral 2201 denotes a date selection screen. Information stored in a storage medium is read out as to dates when respective image sets were stored, and detected dates 2202 and representative images 2203 of the detected dates are displayed side by side on the date selection screen. If a user selects a particular one of the dates 2202 in the date selection screen 2201, an image selection screen 2201 is displayed. In this image selection screen 2201, the date 2204 selected by the user is displayed and furthermore images in an image set 2205 of the selected date 2204 are displayed side by side. The user is allowed to select a desired image from the displayed image set 2205.

However, when a user tries to select a desired image, there is a possibility that the user may accidentally designate a wrong date different from the date of the desired image. In such a case, in the technique disclosed in Japanese Patent Laid-Open No. 2005-119083, only images of the designated date are displayed in the image selection screen. Therefore, it is necessary to repeat the operation of returning the screen to the date selection screen 901 and designating the date until a correct date is designated. Thus, it is not easy to find a desired image.

SUMMARY OF THE INVENTION

In an aspect, the present invention provides a display control apparatus and a display control method that solve the problems described above. In another aspect, the present invention provides a display control apparatus and a display control method that allow it to easily find and select a desired image.

An apparatus according to an embodiment includes an acquisition unit configured to acquire a plurality of pieces of image data based on image information related to the image data; a selection unit configured to select an image group from a plurality of image groups, based on the image information; and a display control unit configured to cause a display to display images such that images based on the plurality of pieces of image data acquired by the acquisition unit are displayed on the display, wherein the display control unit causes the display to display a plurality of images such that images based on the plurality of pieces of image data acquired by the acquisition unit are arranged in a predetermined order, and wherein in a case where the image group is selected by the selection unit, the display control unit causes the display to display images such that images are displayed in a displaying state in which at least one image included in the image group selected by the selection unit is displayed in a manner distinguishable from at least one image that is not included in the image group selected by the selection unit.

Further features of the present invention will become apparent from the following description of exemplary embodiments with reference to the attached drawings.

BRIEF DESCRIPTION OF THE DRAWINGS

FIG. 8 is a diagram illustrating an example of a data format of a list of images in an image processing apparatus according to an embodiment.

FIG. 22 is a diagram illustrating a method of selecting an image in a display screen.

DESCRIPTION OF THE EMBODIMENTS

The present invention is described in further detail below with reference to embodiments in conjunction with drawings. Note that the embodiments described below are only for illustration purposes and not for limitation.

First Embodiment

Figure 1:
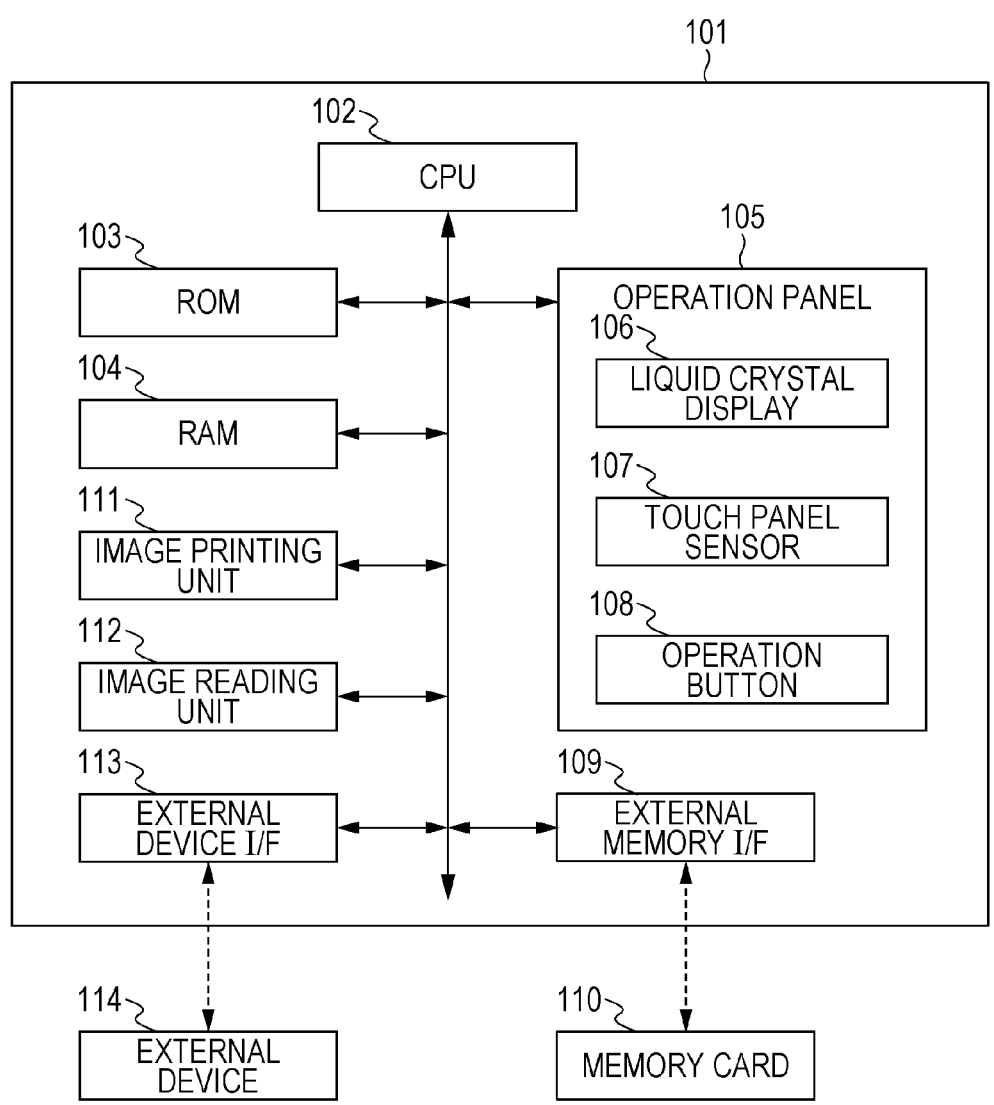
FIG. 1 is a function block diagram of an image processing apparatus according to an embodiment.

FIG. 1 is a function block diagram of an image processing apparatus according to a first embodiment. As illustrated in FIG. 1, the image processing apparatus 101 includes a CPU 102, a ROM 103, a RAM 104, an image printing unit 111, an image reading unit 112, an external device I/F 113, an operation panel 105, and an external memory I/F 109.

The CPU 102 loads a program stored in a ROM 103 and the like to a RAM 104 and runs the program on the RAM 104, thereby controlling the entire image processing apparatus according to the present embodiment. In addition to the control over the entire image processing apparatus, the CPU 102 also controls an operation of reading out image data from a memory card 110 and displaying the read image data on a liquid crystal display 106 serving as a display unit.

The ROM 103 stores a program executed by the CPU 102. The RAM 104 is used by the CPU 102 when the CPU 102 performs control operations.

The operation panel 105 includes a liquid crystal display 106, a touch panel sensor 107, and an operation button 108. The liquid crystal display 106 displays a status of the image processing apparatus 101, a menu screen or the like in response to an operation on the image processing apparatus 101 by a user, and an image read out from the memory card 110. The touch panel sensor 107 senses a touching operation of a command medium such as a finger of a user and detects a user's operation. The operation button 108 senses a pressing-down operation or the like performed with a finger or the like to detect a user's operation. In the present embodiment, it is assumed by way of example but not limitation that the image processing apparatus 101 includes the operation panel 105 as a user interface. Alternatively, the image processing apparatus may include as a user interface, for example, an input device configured to input a command or the like issued by a user, and a display apparatus configured to display information or images for the user such that the input device and the display apparatus are disposed separately.

The external memory I/F 109 is configured to connect to the external memory card 110 and transmit and receive data to or from it. An example of the memory card 110 is an SD card.

The image processing apparatus 101 is connectable to the external device 114 via the external device I/F 113. An example of the external device 114 is an information device such as a personal computer, a server, or the like. Examples of the external device I/F 113 include a wired local area network (LAN), a wireless LAN, a universal serial bus (USB), and the like for transmitting and receiving data to or from the external device 114.

The image printing unit 111 has a function of printing a document, an image, or the like read out by the image reading unit 112, printing data received from the external device 114 on a recording medium, and printing image data read out from the memory card 110 on a recording medium. There is no restriction on the type of the image printing unit 111 as long as the image printing unit 111 is capable of printing image data. In the present embodiment, it is assumed by way of example that printing is performed using an ink-jet method.

The image reading unit 112 has a function of reading a document or an image put on a document plate.

Figure 2A:
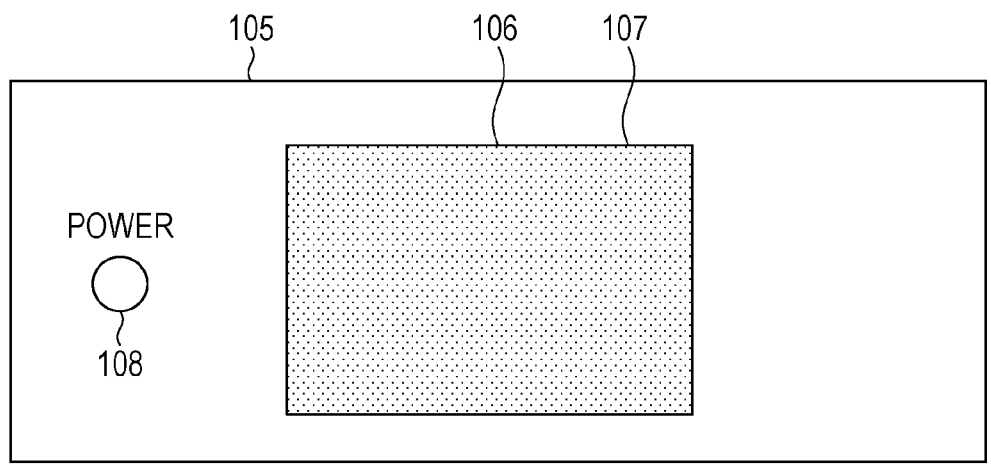
FIG. 2A is a schematic diagram illustrating an operation panel of an image processing apparatus according to an embodiment.
Figure 2B:
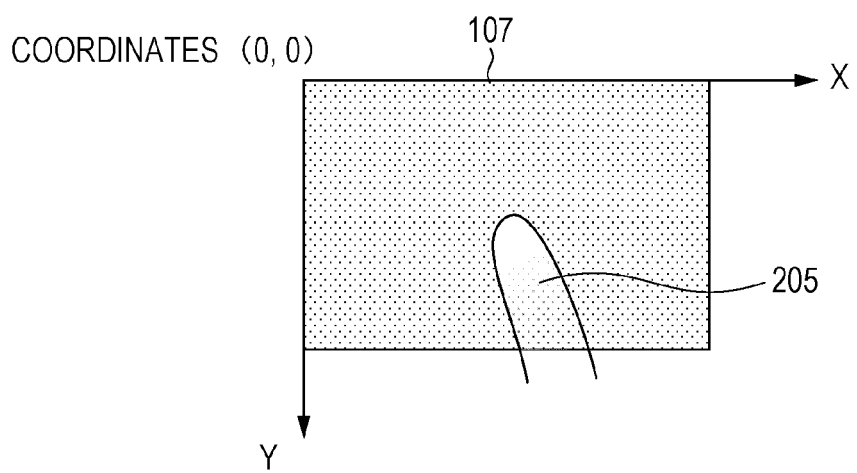
FIG. 2B is a diagram illustrating details of the operation panel.

FIGS. 2A and 2B are schematic diagrams associated with the operation panel 105 illustrated in FIG. 1.

FIG. 2A schematically illustrates the operation panel 105 illustrated in FIG. 1. As illustrated in FIG. 2A, the operation panel 105 includes the liquid crystal display 106. In the present embodiment, the touch panel sensor 107 is of an electrostatic capacitance type and is laminated on the liquid crystal display 106. The operation panel 105 also includes a power button (operation button) 108 for turning on and off power of the liquid crystal display 106.

FIG. 2B illustrates the operation panel 105 in further detail. That is, FIG. 2B illustrates a state in which the touch panel sensor 107 is touched with a finger 205 of a user. The touch panel sensor 107 operates under the control of the CPU 102 to detect various operations performed by a user. For example, the operations include a "touch operation" in which a user touches a surface of the touch panel sensor 107 a "tap operation" in which the touch panel sensor 107 is tapped with a finger and the finger is moved away from the touch panel sensor 107 without being slid, a "drag operation" in which a finger in contact with the touch panel sensor 107 is slid, and a "flick operation" in which a finger in contact with the touch panel sensor 107 is quickly moved and then moved away. The touch panel sensor 107 determines what is intended by an operation by a user based on coordinates at which the operation is detected and a content displayed on the liquid crystal display 106 when the operation is detected.

Figure 9A:
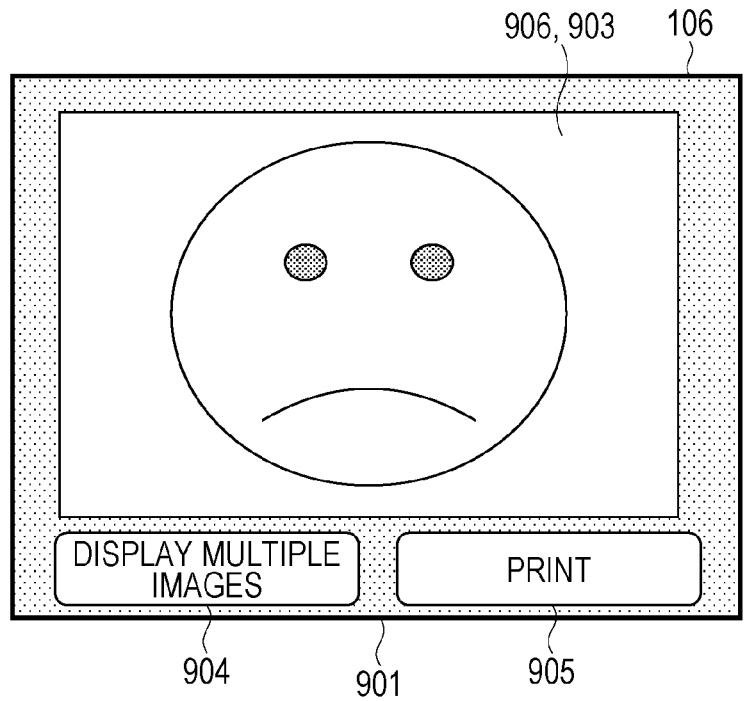
FIGS. 9A and 9B are diagrams illustrating an example of a single-image display screen in an image processing apparatus according to an embodiment.
Figure 9B:
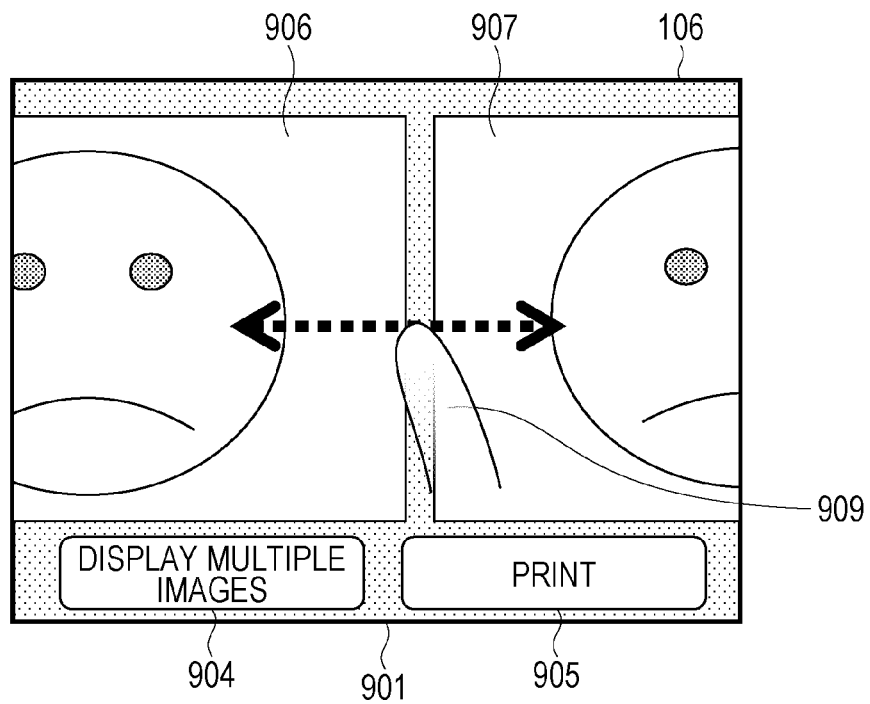
Figure 10:
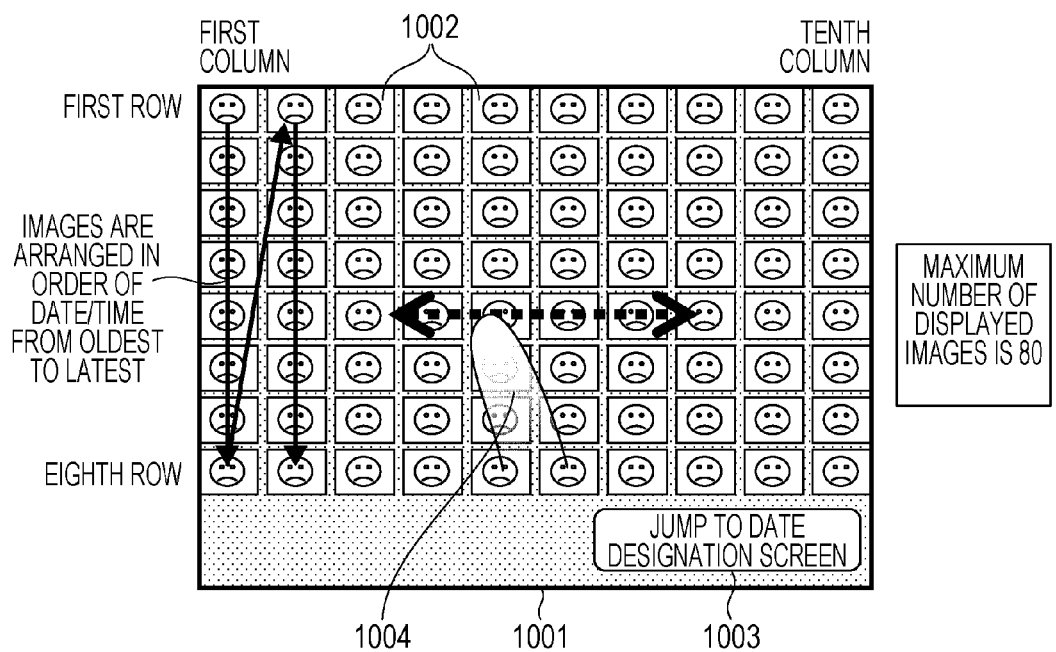
FIG. 10 is a diagram illustrating an example of a multiple-image display screen in an image processing apparatus according to an embodiment.
Figure 11:
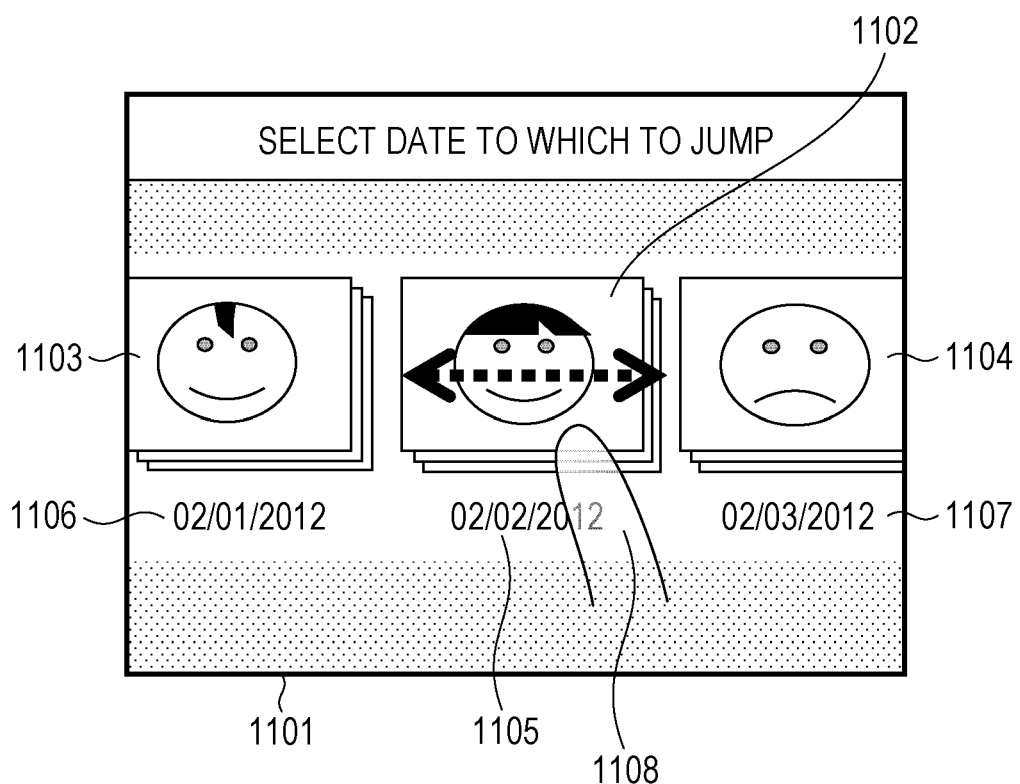
FIG. 11 is a diagram illustrating an example of a date designation screen in an image processing apparatus according to an embodiment.
Figure 12A:
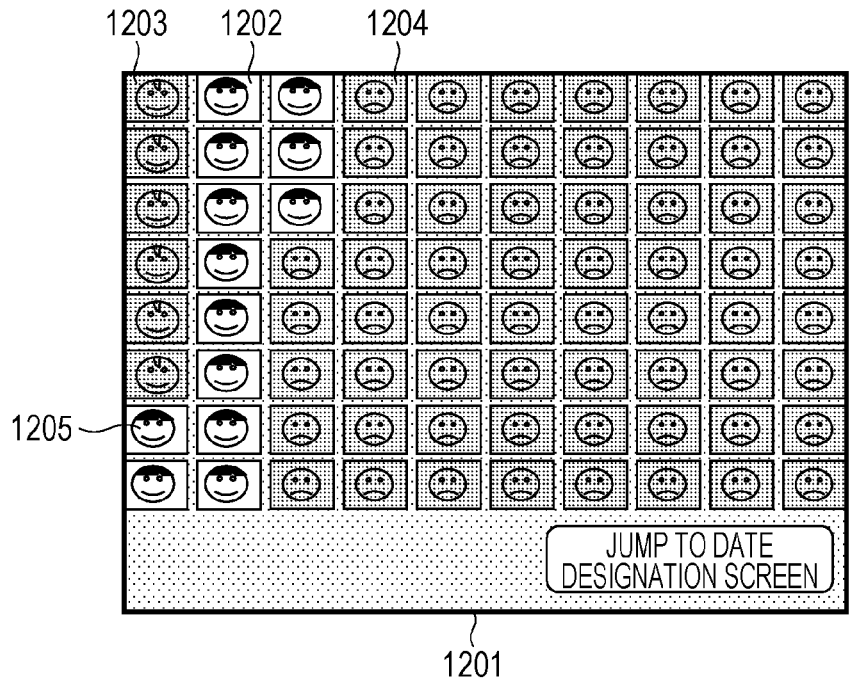
FIG. 12A is a diagram illustrating an example of a multiple-image display screen displayed in a mode in an image processing apparatus according to an embodiment.
Figure 12B:
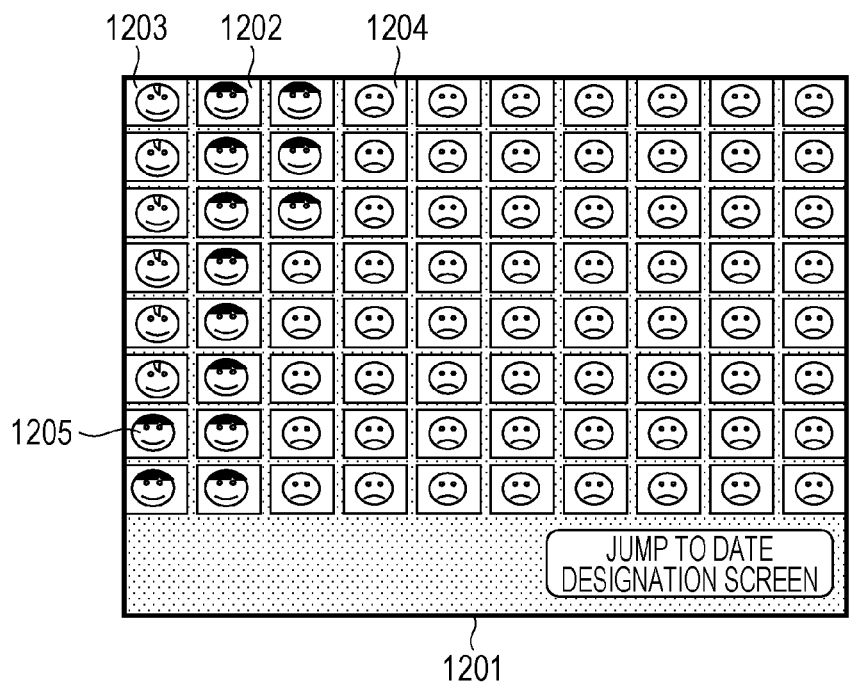
FIG. 12B is a diagram illustrating an example of the multiple-image display screen displayed in another mode.

Referring to FIGS. 3 to 6, FIGS. 9A, 9B, 10, 11, 12A, and 12B characteristic operations according to the present embodiment are described below. FIGS. 3 to 6 are flow charts illustrating an operation of the image processing apparatus 101 in an "images-in-card display mode" according to the present embodiment. In this mode, a user is allowed to quickly find a desired image from a plurality of images stored in the memory card 110. FIGS. 9A and 9B are diagrams illustrating contents displayed in a single-image display screen. FIG. 10 is a diagram illustrating a content displayed in a multiple-image display screen. FIG. 11 is a diagram illustrating a content displayed in a date designation screen. FIGS. 12A and 12B are diagrams illustrating examples of manners in which the multiple-image display screen is displayed after a date is selected.

Figure 3:
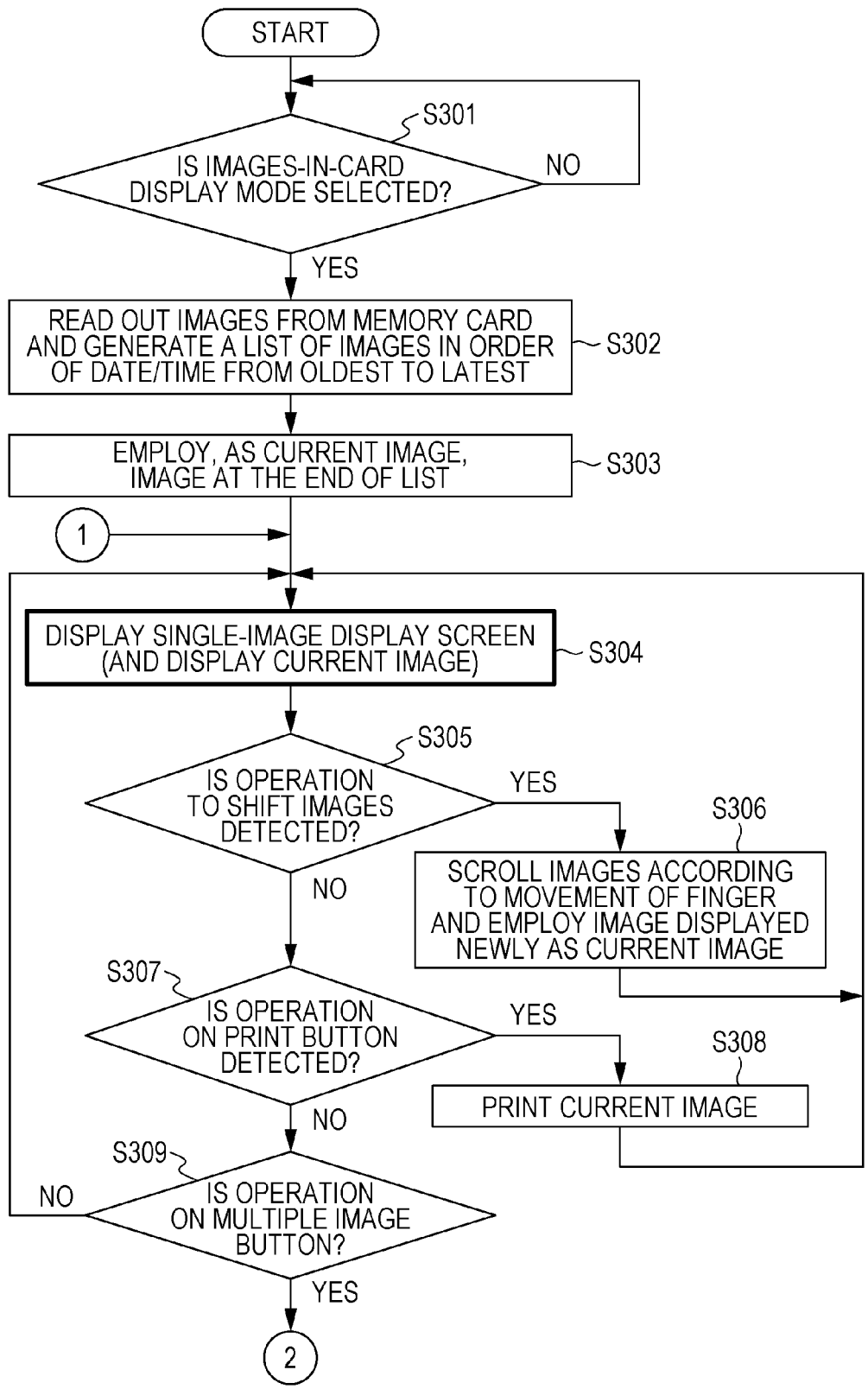
FIG. 3 is a flow chart illustrating an operation of an image processing apparatus in an images-in-card display mode according to an embodiment.
Figure 4:
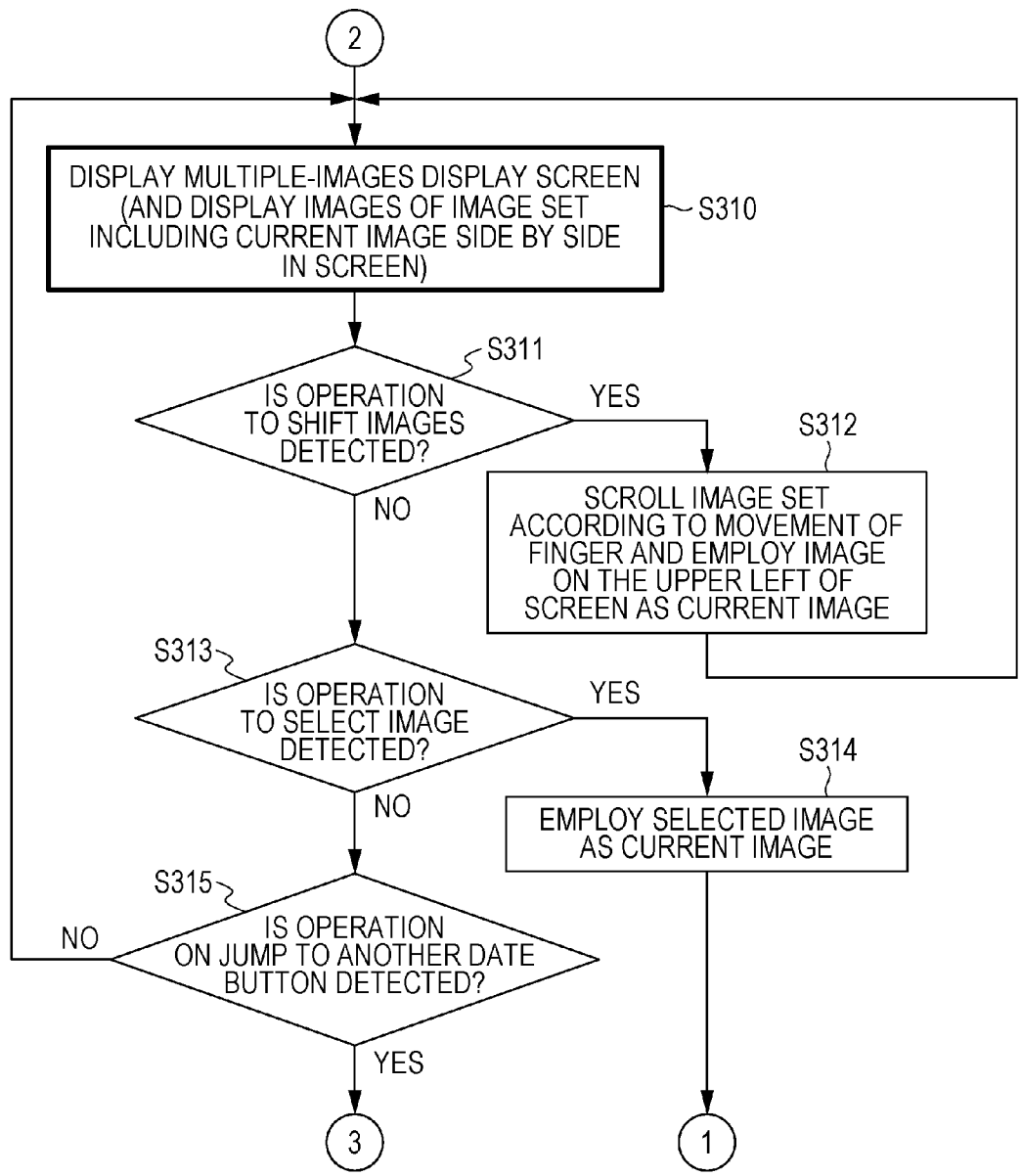
FIG. 4 is a flow chart illustrating an operation of an image processing apparatus in an images-in-card display mode according to an embodiment.
Figure 5:
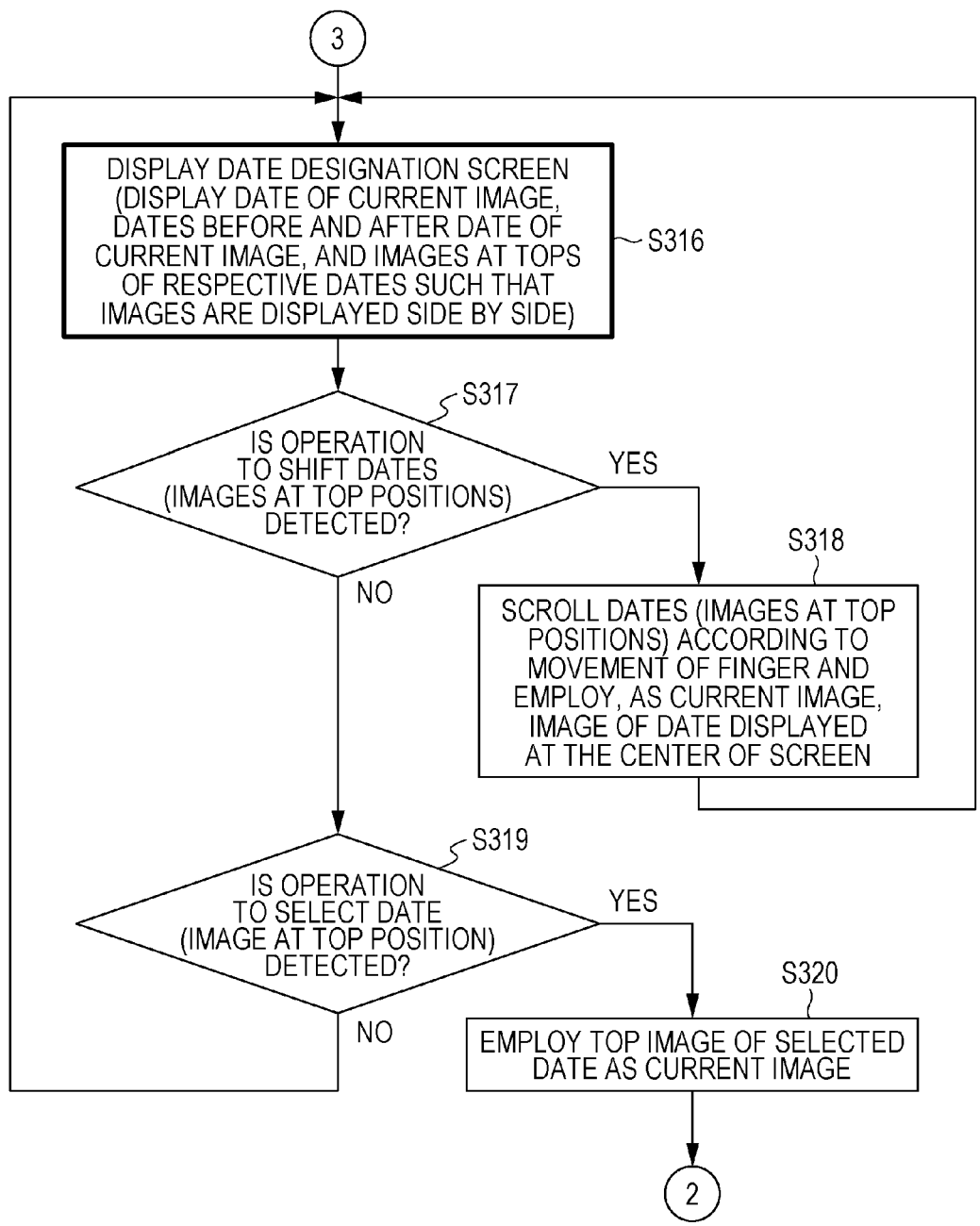
FIG. 5 is a flow chart illustrating an operation of an image processing apparatus in an images-in-card display mode according to an embodiment.

When an operation on the operation button 108 is detected, the power of the image processing apparatus 101 is turned on, and a menu screen is displayed on the liquid crystal display 106, and thus the operation illustrated in the flow chart of FIG. 3 is started.

In S301, a determination is performed as to whether the "images-in-card display mode" on the menu screen is selected. In a case where it is detected that the "images-in-card display mode" is selected, the processing flow proceeds to S302.

If the selection of the "images-in-card display mode" is detected, then, under the control of the CPU 102, image files are read out from the memory card 110 via the external memory I/F 109 and date-time information (time stamp) of each image file is detected. A list of images is then generated in the RAM 104 such that images are arranged in order of date-time information from the oldest to the latest (S302). That is, image files including related image information (date-time information in the present embodiment) are acquired from the memory card 110, and the list of images is generated such that images included in the image files are arranged in particular order based on the image information.

Figure 7:
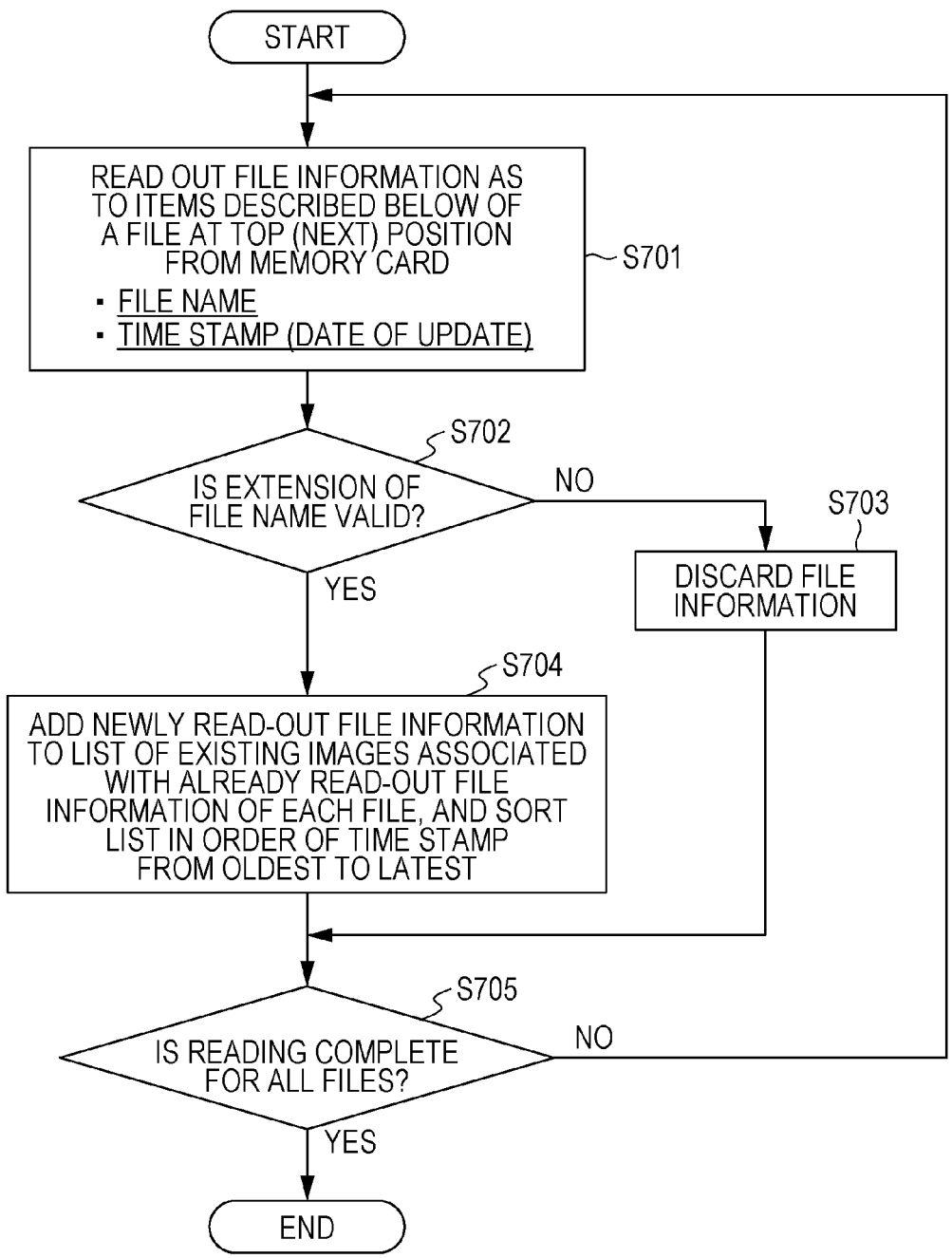
FIG. 7 is a flow chart illustrating a process of generating a list of images in an image processing apparatus according to an embodiment.

Referring to FIG. 7, a method of generating the list of images is described. FIG. 7 is a flow chart illustrating a procedure of generating the list of images in S302.

First, the image processing apparatus 101 reads out file information of a file at the top from the memory card 110 (S701). That is, the file information is acquired from the memory card 110. In the present embodiment, the image processing apparatus 101 has a capability of treating a FAT (File Allocation Table) file system, and thus the image processing apparatus 101 is capable of sequentially reading out file information in terms of a file name and a time stamp (a date and time when a file was updated) from each file stored in the FAT format in the memory card 110.

Next, it is checked whether the read file is valid (S702). In the present embodiment, by way of example, the checking of whether the read file is valid is performed based on an extension of a file name. More specifically, the file is regarded as being valid only when the extension is one of JPG, TIF, jpg, and tif.

In a case where the read file is invalid, the information of the invalid file is discarded (S703). On the other hand, in a case where the read file is valid, the newly read file information is added to the list of images, and the list of images is updated by rearranging the images in order of the time stamp of the file information from the oldest to the latest (S704).

Next, a determination is performed as to whether the reading of the file information in the updating of the list of images is completed for all files (S705). In a case where the reading of the file information is not completed for all files, the processing flow returns to S701. On the other hand, in a case where the reading of the file information is completed for all files, the process is ended. That is, the process is repeated until it is determined in S705 that the reading of file information is completed for all files and thus the generating of the list of images is completed.

FIG. 8 is a diagram illustrating a data format of the list of images. In an example illustrated in FIG. 8, the list of images includes five pieces of image data. The list of images 801 includes a list number 802 serially assigned to indicate a position in the list of images for each piece of image data, a file name 803 of each piece of image data, and time stamp information 804 of each piece of image data. In the present embodiment, it is assumed by way of example that the list of images 801 includes the list number 802, the file name 803, and the time stamp information 804. However the format of the list of images 801 is not limited to this example. For example, the list of images 801 may include further information of an image.

Referring again to FIG. 3, in S303, an image at the end of the list of images, that is, an image of latest date-time information is employed as a current image (an image that is to be displayed at a reference position in the screen) and stored in the RAM 104.

Next, the screen of the liquid crystal display 106 is switched to a "single-image display screen" (S304). In this "single-image display screen", one image is displayed.

Referring to FIG. 9A, the single-image display screen is described. FIG. 9A illustrates an example of the single-image display screen. The single-image display screen 901 includes an image 906 which is a current image, a multiple-image display button 904, and a print button 905. As described above, in the single-image display screen 901, one image is set as the current image 903, and this one image is displayed in a large area of the liquid crystal display 106. In this single-image display screen 901, the current image 903 displayed allows a user to recognize the content of images stored in the memory card 110. The provision of the print button 905 in the single-image display screen 901 allows it to print the current image 903 as required.

Referring again to FIG. 3, a determination is then performed as to whether an operation of shifting images by a user is detected (S305). In the present embodiment, when a dragging or flicking operation with a finger to the right or left in the single-image display screen 901 is detected, it is determined that an image shift operation is performed.

In a case where an image shift operation by a user is detected, the current image is switched (S306). More specifically, when an operation of sliding a finger by a user is detected, the image 906 in the single-image display screen 901 is slid according to the motion of the finger such that the image displayed is switched to a next (or previous) image in the list of images. The image displayed newly is employed as the current image. FIG. 9B illustrates a state in the middle of the operation of switching the original displayed image 906 to a next displayed image 907 in the single-image display screen 901 according to the motion of the finger 909. In the present embodiment, when an image shift operation by a user in the single-image display screen 901 is detected, the image is switched to a next image via a state in which images are being slid according to the motion of a user's finger as illustrated in FIG. 9B, that is, via a state in which a user is allowed to recognize the current image and the next image.

In S307, a determination is performed as to whether an operation on the print button 905 in the single-image display screen 901 is detected.

In a case where an operation on the print button 905 is detected, the processing flow proceeds to S308, in which the CPU 102 performs an image processing on the current image 903 being displayed, and the image printing unit 111 prints the current image.

In a case where an operation on the print button 905 is not detected, the processing flow proceeds to S309. In S309, a determination is performed as to whether, in the single-image display screen 901, a command to change the screen to the multiple-image display screen is issued, that is, whether an operation on the multiple-image display button 904 is detected. In a case where an operation of selecting the multiple-image display button 904 is detected, the screen is changed to a "multiple-image display screen" (S310 in FIG. 4). In other word, the mode is changed to the "multiple-image display mode" to display a plurality of images.

Referring to FIG. 10, the multiple-image display screen is described. FIG. 10 is a diagram illustrating an example of a multiple-image display screen 1001. In the single-image display screen such as that illustrated in FIG. 9A or 9B, only one image is displayed in an enlarged fashion, and it is difficult to quickly find a desired image from many images. In contrast, in the multiple-image display screen such as that illustrated in FIG. 10, a plurality of images 1002 are displayed such that each image 1002 has a small size and they are arranged in an array, and such that it is allowed to shift the plurality of images 1002 as a whole. Thus it is allowed to easily find a desired image. In the multiple-image display screen 1001, as illustrated in FIG. 10, the plurality of images 1002, and a jump to date designation screen button 1003 used to jump to the date designation screen. In the present embodiment, the images 1002 are displayed in the multiple-image display screen 1001 such that up to 80 images are arranged in an array including 10 vertical columns and 8 horizontal rows, and more specifically such that the images 1002 are serially put from the top to the bottom in each column and from one column to another in a direction from left to right starting from the top of the first column, that is, the leftmost column of the screen.

Referring again to FIG. 4, in S310, an image (a current image) displayed in the single-image display screen is displayed in the multiple-image display screen 1001. A method will be described in detail later as to how the image (the current image) displayed in the single-image display screen is displayed in the multiple-image display screen 1001. Although there is no particular restriction on the location at which the current image in the single-image display screen is displayed in the multiple-image display screen 1001, in the present example the current image is displayed in a leftmost column. This makes it possible to additionally display at least images of date/time older than the date/time of the current image in the multiple-image display screen.

Next, a determination is performed as to whether an image shift operation in the multiple-image display screen is detected (S311). The image shift operation is performed in a similar manner as in the singe-image display screen. That is, when a dragging or flicking operation with a finger 1004 to the right or left is detected, it is determined that an image shift operation is performed. In a case where an image shift operation is detected, the processing flow proceeds to S312, but otherwise the processing flow proceeds to S313.

In S312, the image set is scrolled to the right or left according to a motion of a finger 1004. That is, images displayed in the multiple-image display screen are changed by changing only images in the rows while maintaining the positions of the images in the column direction. As a result, the images displayed in the multiple-image display screen are replaced with images older or later than those displayed before the image shift operation. Furthermore, in response, an image newly displayed on the top left position of the multiple-image display screen 601 is employed as a new current image. The processing flow then returns to S310. In the multiple-image display screen, as described above, a plurality of images is displayed such that it is allowed to shift the plurality of images as a whole, and thus it is possible to quickly find a desired image.

In S313, a determination is performed as to whether an operation to select an image is detected. That is, it is determined whether a user has found a desired image and has performed an operation (tap operation) to select the image. In a case where no operation to select an image is detected, the processing flow proceeds to S315. In a case where an operation to select an image is detected in S313, then the selected image is employed as a new current image (S314), and the screen is returned to the single-image display screen in which the selected image is displayed in an enlarged fashion (S304).

In S315, a determined is performed as to whether a command to jump to the date designation screen is issued, that is, whether an operation on the jump to date designation screen button is detected. In the present embodiment, as illustrated in FIG. 10, the multiple-image display screen 1001 includes the jump to date designation screen button 1003 that makes it possible to quickly find an image. If an operation (tap operation) to select the jump to date designation screen button 603 is detected in S315, the screen is switched to the "date designation screen" (S316). That is, the date designation screen is displayed on the liquid crystal display 106. In other words, the mode is changed to the "selection mode" in which it is allowed to select an image group.

Next, a determination is performed as to whether an image shift operation in the date designation screen is detected (S317). Herein, the image shift operation is similar to that in the single-image display screen or the multiple-image display screen. That is, when a dragging or flicking operation with a finger to the right or left is performed, it is determined that an image shift operation is detected. In a case where an image shift operation is detected, the processing flow proceeds to S318, but otherwise the processing flow proceeds to S319.

In response to detecting the image shift operation, the dates and the set of top images in the screen are slid according to the motion of the finger. More specifically, when an image is dragged or flicked with a finger 1108 to the right or left, dates and top images of the respective dates are sequentially shifted and displayed in accordance with the image shift operation on the selected image, and an image located at the center of the date designation screen 701 is set as a new current image (S318). The processing flow then returns to S316.

In S319, a determination is performed as to whether a selection operation on a date or a top image in the date designation screen is detected. When a selection operation (a tap operation) is detected on a date or a top image on the date designation screen, the top image of the selected date or the selected top image is set as the current image (S320). The screen is then returned to the multiple-image display screen (S310) and the top image of the selected date and images that are older or later than the selected image are displayed in the multiple-image display screen.

Referring to FIG. 11, the date designation screen is described. FIG. 11 illustrates an example of a date designation screen. In the date designation screen 1101 illustrated in FIG. 11, the pieces of image data included in the list of images are grouped based on image information (date information in this example) of the image data. In other words, in the date designation screen 1101, the pieces of image data included in the list of images are grouped into a plurality of image groups according to the date thereof. In the present example, three dates and top images of the respective dates (the newest images of the respective dates) are displayed in the date designation screen 1101. Information displayed in the date designation screen 1101 includes a character string 1105 indicating the date of the current image, a top image 1102 of this date, a character string 1106 indicating a date immediately before the date of the current image, a top image 1103 of this date, a character string 1107 indicating a date immediately after the date of the current image and a top image 1104 of this date. In FIG. 11, if a character string indicating a date or a top image of this date is selected, then images of the selected date and images of respective adjacent dates are displayed in the multiple-image display screen as will be described in detail later. In the example described above, although three dates and top images of these respective dates are displayed in the date designation screen, dates and images displayed are not limited to those. For example, four or more dates may be displayed. Furthermore, an image displayed for each date is not limited to a top image, but an image in the middle or at the end may be displayed.

Even in the multiple-image display screen, when there are a very large number of images, it is necessary to repeat the image shift operation many times until a desired image is found. To avoid such a situation, the present embodiment provides the date designation screen such as that illustrated in FIG. 11 such that a user is allowed to select a date. When a date is selected, images of the selected date (and dates close to the selected date) are displayed distinguishably from the other images in the multiple-image display screen thereby allowing a reduction in time spent to find an image.

Figure 6:
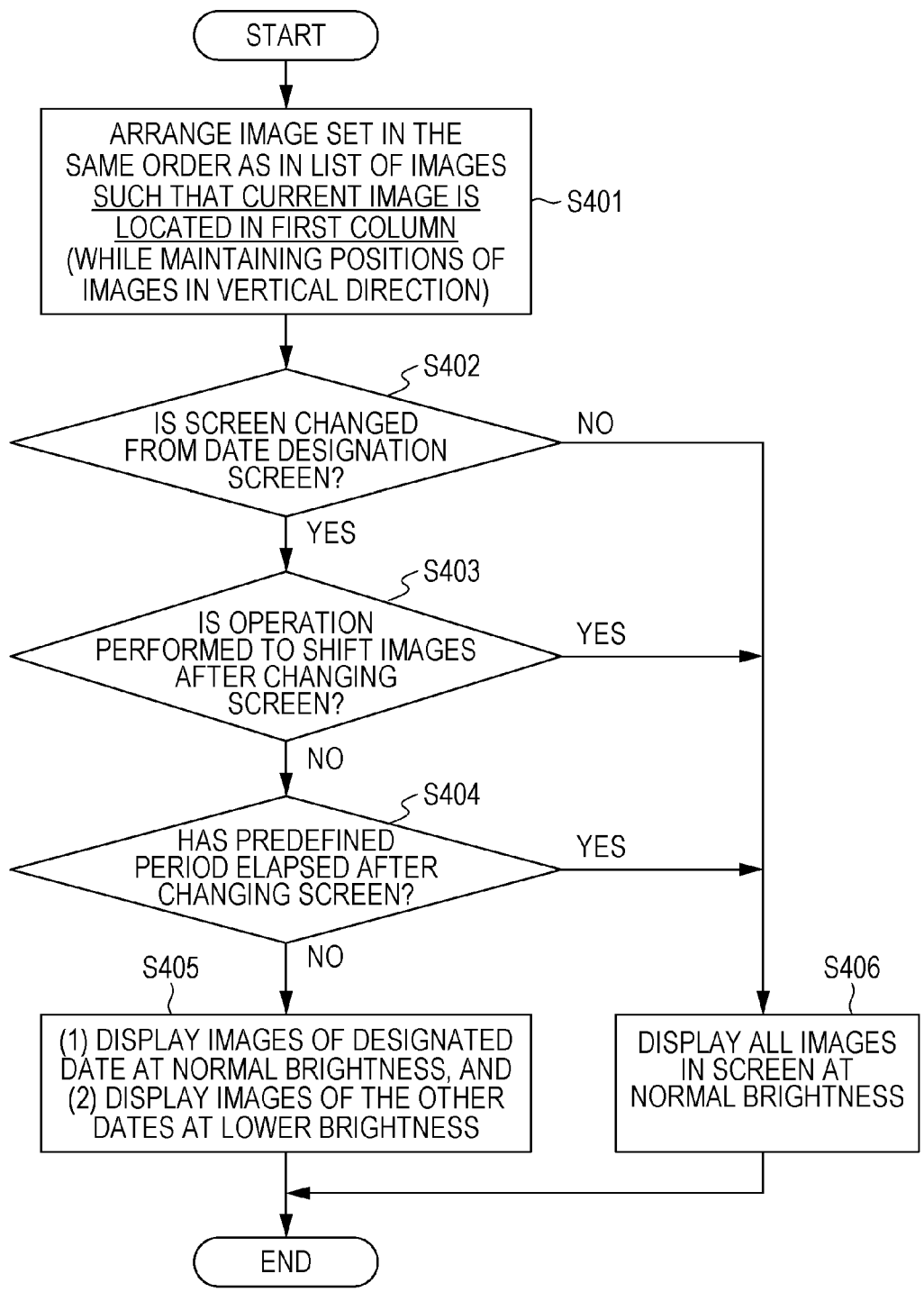
FIG. 6 is a flow chart illustrating details of a process associated with displaying a multiple-image display screen in an image processing apparatus according to an embodiment.

FIG. 6 is a flow chart illustrating details of a process, in S310 of FIG. 3, of displaying images in the multiple-image display screen. That is, FIG. 6 illustrates in detail the process performed by the CPU 102 to display images in the multiple-image display screen such that images of a designated date are displayed in a manner different from a manner in which images of other undesignated dates are displayed.

First, when the screen is changed to the multiple-image display screen, an image layout is determined such that the current image is located in the first (leftmost) column of the screen without changing the positions of images in the vertical direction (S401). However, in a case where the list of images includes a small number of images, and thus the current image does not come in the first column, the image layout may be determined such that the current image is located as close to the left-hand edge of the image display area of the multiple-image display screen as possible.

Next, a determination is performed as to whether the transition to the multiple-image display screen is from the date designation screen (S402). In a case the transition to the multiple-image display screen is not from the date designation screen, the processing flow proceeds to S406.

On the other hand, in a case where the transition to the multiple-image display screen is from the date designation screen, the processing flow proceeds to S403. In S403, a determination is performed as to whether an image shift operation is performed after the transition to the multiple-image display screen.

In a case where an image shift operation is detected even only once, the processing flow proceeds to S404. On the other hand, in a case where an image shift operation is not detected even once, the processing flow proceeds to S406.

In S404, a determination is performed as to whether a predetermined period of time (5 seconds in this example) has elapsed. When the predetermined period of time has not yet elapsed, the images of the designated date are displayed at a normal brightness and images of dates other than the designated date are displayed at a lower brightness until the predetermined period of time has elapsed (S405). That is, the images are displayed such that the images of the designated date are distinguishable from the images of the dates other than the designated date. Note that although the images of the dates other than the designated date are displayed at the lowered brightness, it is also allowed to select an image from such images at lowered brightness. That is, also in a case where an image is selected from the images displayed at the lowered brightness, the screen is changed to the single-image display screen. Note that when the predetermined period of time has elapsed, the processing flow proceeds to S406.

In S406, all images in the screen are displayed at the normal brightness.

Referring to FIGS. 12A and 12B, examples of manners of displaying the multiple-image display screen in S310 are described below. That is, FIGS. 12A and 12B illustrates examples of manners of displaying the multiple-image display screen in S310.

In the multiple-image display screen, images are arranged in the same order as in the list of images such that the current image is located in the first column. That is, as illustrated in FIGS. 12A and 12B, the multiple-image display screen 1201 is displayed such that a top image 1205 of the selected date is located at one of positions in the leftmost column in the multiple-image display screen 1201 and such that an image group 1202 of the designated date, an image group 1204 of dates later than the designated date, and an image group 1203 of dates later than the designated date are displayed thereby allowing a user to easily recognize images of the designated date and the images of previous and following dates. In a case where the transition to the multiple-image display screen 1201 is from the date designation screen but no image shift operation is detected after the transition, the images of the image group 1202 of the designated date are displayed at the normal brightness and the image groups (the image group 1203 and the image group 1204) of the other dates are displayed at the lower brightness than the normal brightness as illustrated in FIG. 12A until the predetermined period of time has elapsed. This allows it to easily distinguish between the image group of the designated date and the other image groups. When the predetermined period of time has elapsed, all images (all image groups) are displayed at the normal brightness as illustrated in FIG. 12B.

Note that in the present embodiment, positions of rows of images are not changed, that is, the vertical positions of the images are not changed. In other words, the order of images in a direction perpendicular to a slidable direction is not changed. Therefore, the current image is not necessarily located at the top left of the screen although the current image is located in the first column. That is, in the present embodiment, when images are arranged such that the current image is located in the first column, the vertical positions of the images are not changed. Therefore, in a case where the top image 1205 of the selected date is not located on the top of the leftmost column, images (the image group 1203 in the example illustrated in FIG. 12A) of a date (dates) before the selected date are displayed. In this case, images of the selected date and images of dates before and after the selected date are displayed.

In the multiple-image display screen, if images of the selected date and images of dates before and after the selected date are simply displayed unlike the present embodiment, it may be difficult to recognize where the images of the designated date are displayed, and thus it may be difficult to find images although the date is correctly designated. In contrast, in the present embodiment, as described above, the images of the designated date are displayed at relatively higher brightness than the brightness of the other images for a particular period of the time immediately after the transition to the multiple-image display screen from the date designation screen in which the date is designated. As described above, in the case where the transition to the multiple-image display screen is from the date designation screen, the images of the image group of the designated date are displayed in the multiple-image display screen in a different manner from the manner in which the images of the other image groups are displayed such that it is allowed to easily find a desired image. That is, it is allowed to easily determine whether a desired image is included in the displayed images of the date designated in the date designation screen. This effect is more remarkable when a large number of images with reduced sizes are displayed side by side.

In the technique disclosed in Japanese Patent Laid-Open No. 2005-119083, only images of a designated date are simply displayed side by side in a screen. Therefore, in this technique, when a user accidentally designates a wrong date that is before or after a date of an actually desired image, it is necessary to return to date designation screen to again designate a date. In this regard, in the present embodiment, when a date is designated, not only images of the designated date but also images of dates before and after the designated date are displayed in the multiple-image display screen. In the present embodiment, even in a state in which images of date other than the designated date are displayed at low brightness, it is possible to recognize contents of the images. Therefore, even in a case where a date actually designated by a user is different from a date of an image the user really wants, it is allowed to quickly find the desired image as long as the difference between dates is within a particular range. Furthermore, in the present embodiment, after images are displayed in the multiple-image display screen in the mode in which an image group of a designated date are displayed in a manner different from a manner in which the other image groups are displayed, if a predetermined period of time has elapsed, then all images are equally displayed at the normal brightness. Therefore, when images are displayed such that images of a designated date are distinguishable from images of other dates, a user may recognize positions of the images of the designated date in the multiple-image display screen, and when all images are equally displayed at the normal brightness thereafter, the user may check images of dates before or after the designated date to easily find a desired image.

Furthermore, in the present embodiment, when images are arranged in the multiple-image display screen, only horizontal display positions of images are moved without changing the vertical positions. This makes it possible to simplify the process of displaying the images compared with the process disclosed in Japanese Patent Laid-Open No. 2005-119083 in which images are rearranged starting at the top left of the screen each time a date is designated. Thus, the process according to the present embodiment may be executed by a small-sized computer program.

Furthermore, in the present embodiment, the date designation screen for displaying images of a selected date is based on the multiple-image display screen. This allows a reduction in size of the program stored in the ROM compared with a case where a screen with a different layout is displayed.

Second Embodiment

In the image processing apparatus according to the first embodiment described above, when a predetermined period of time has elapsed since the transition to the multiple-image display screen, the mode in which images of dates other than a designated date are displayed at lower brightness is cancelled. However, in a second embodiment described below, the mode is maintained until all images of a designated date are displayed.

The image processing apparatus according to the second embodiment is similar to the image processing apparatus according to the first embodiment in terms of the functional block (FIG. 1), the external appearance of the operation panel (FIGS. 2A and 2B), the processing flow in the images-in-card display mode (FIG. 3), and the manners of displaying images (FIGS. 5 to 8), and thus a duplicated description thereof is not given.

Figure 13:
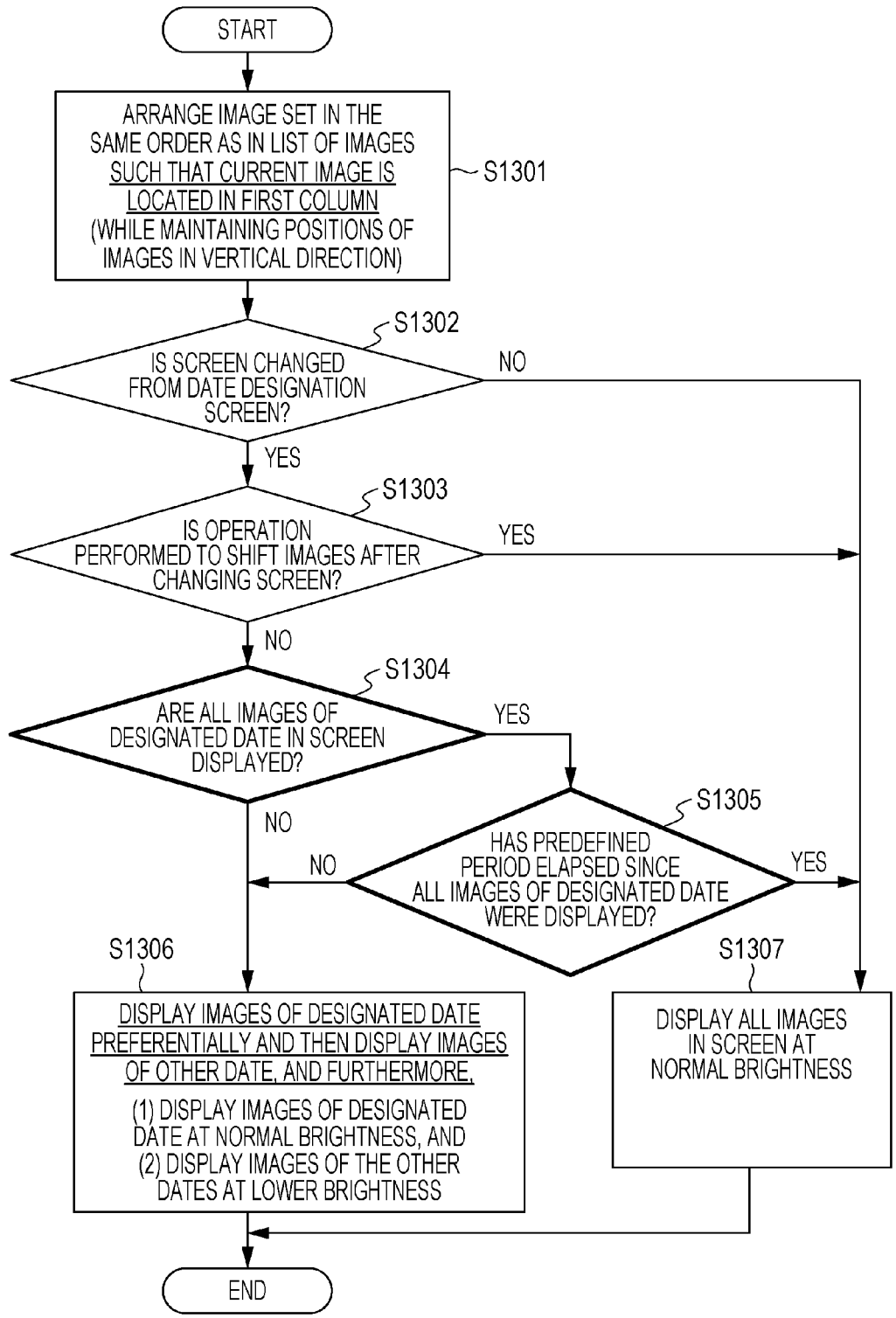
FIG. 13 is a flow chart illustrating details of a process associated with displaying a multiple-image display screen in an image processing apparatus according to an embodiment.

Referring to FIG. 13, a description is given below as to a manner of displaying images in a multiple-image display screen according to the second embodiment. FIG. 13 is a flow chart illustrating details of a process of displaying the multiple-image display screen according to the second embodiment.

Also in the image processing apparatus according to the present embodiment, as with the image processing apparatus according to the first embodiment, when the screen is changed to the multiple-image display screen, a current image is displayed in the first column of the screen (S1301). That is, image sets are arranged in the same order as in the list of images such that the current image is located in the first column. However, in a case where the list of images includes a small number of images, and thus the current image does not come in the first column, the image layout may be determined such that the current image is located as close to the left-hand edge of the multiple-image display screen as possible. In this determination of the image layout, positions of rows of images are not changed. Therefore, the current image is not necessarily located at the top left of the screen although the current image is located in the first column.

Next, in S1302, a determination is performed as to whether the switching to the multiple-image display screen is from the date designation screen. In a case where the switching to the multiple-image display screen is from the date designation screen, the processing flow proceeds to S1303. On the other hand, in a case where the switching to the multiple-image display screen is from a screen other than the date designation screen, the processing flow proceeds to S1307.

In S1303, a determination is performed as to whether an image shift operation is detected even only once. In a case where an image shift operation after the transition to the multiple-image display screen is detected even only once, the processing flow proceeds to S1307. On the other hand, in a case where an image shift operation is not detected, the processing flow proceeds to S1304.

In S1304, a determination is performed as to whether displaying of images of the designated date in the screen is completed for all images of the designated date.

In a case where it is determined in S1304 that all images of the designated date are not displayed in the screen, the processing flow proceeds to S1306. In S1306, the images of the designated date are displayed at a normal brightness, and images of dates other than the designated date are displayed at a lower brightness. That is, until all images of the designated date are displayed on the screen, the images of the designated date are displayed at the normal brightness, and images of the dates other than the designated date are displayed at lower brightness than the normal brightness. In this process, the images of the designated date are displayed preferentially. After displaying of the images of the designated date is completed, the images of the other dates are displayed.

In a case where it is determined in S1304 that all images of the designated date are displayed on the screen, the processing flow proceeds to S1305.

In S1305, a determination is performed as to whether a predetermined period of time has elapsed since all the images of the designated date were displayed. In a case where the predetermined period of time has not elapsed, the processing flow proceeds to S1306. In S1306, the images of the designated date are displayed at a normal brightness and images of dates other than the designated date are displayed at a lower brightness. On the other hand, in a case where the predetermined period of time has elapsed, the processing flow proceeds to S1307.

In S1307, all images are displayed at the normal brightness as with images 1202 illustrated in FIG. 12B.

In the present embodiment, as in the first embodiment, when the transition to the multiple-image display screen is from the date designation screen, the image group of the designated date is displayed in a manner different from a manner in which the other image groups are displayed such that it is allowed to easily find a desired image. Furthermore, the above-described process according to the present embodiment may be executed by a small-sized computer program.

It takes a total of several seconds to several ten seconds to read out all images from the memory card 110 and display the images on the multiple-image display screen. In the image processing apparatus according to the first embodiment described above, when a predetermined period of time has elapsed since the transition to the multiple-image display screen, the state illustrated in FIG. 12A is released. Therefore, there is a possibility that the state illustrated in FIG. 12A is released before displaying of images of the designated date is completed for all such images. In the present embodiment, to avoid such a situation, the state illustrated in FIG. 12A is not released until all images of the designated date are completely displayed, and thus it is possible to indicate a precise range associated with the designated date.

Furthermore, displaying the images of the designated date preferentially ensures that a precise range is indicated in terms of images of the designated date.

Third Embodiment

In the image processing apparatus according to the first embodiment described above, when an image shift operation is detected even only once, images of dates other than the designated date are released from the state in which they are displayed at lower brightness. In contrast, in a third embodiment described below, as long as images of a designated date are displayed on the screen, images of dates other than the designated date are not released from the state in which they are displayed at lower brightness.

The image processing apparatus according to the third embodiment is similar to the image processing apparatus according to the first embodiment in terms of the functional block (FIG. 1), the external appearance of the operation panel (FIGS. 2A and 2B), the processing flow in the images-in-card display mode (FIG. 3), and the manners of displaying images (FIGS. 5 to 8), and thus a duplicated description thereof is not given.

Figure 14:
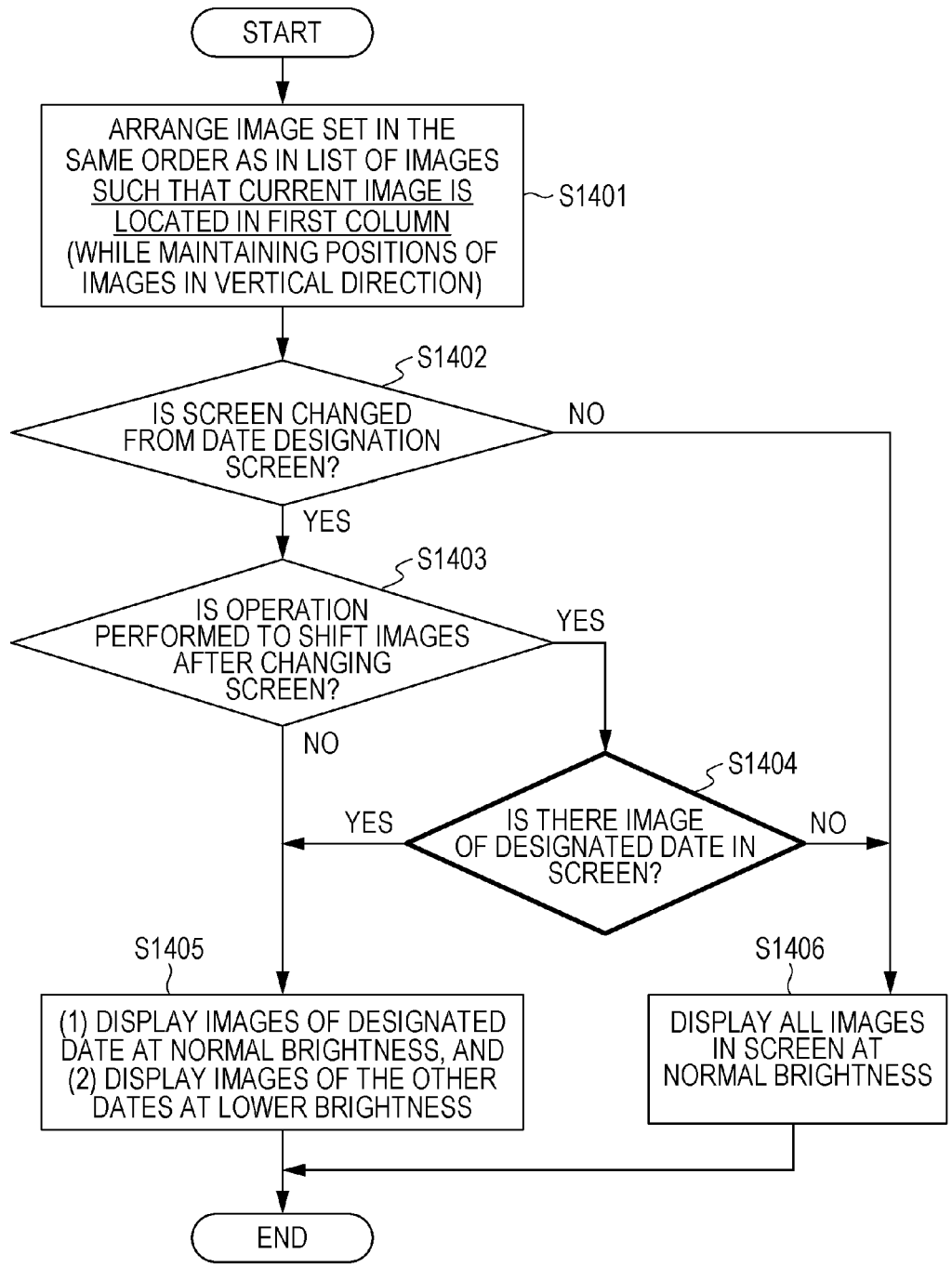
FIG. 14 is a flow chart illustrating details of a process associated with displaying a multiple-image display screen in an image processing apparatus according to an embodiment.

Referring to FIG. 14, a description is given below as to a manner of displaying images in a multiple-image display screen according to the third embodiment. FIG. 14 is a flow chart illustrating details of a process of displaying images in the multiple-image display screen according to the third embodiment.

First, when a transition to the multiple-image display screen occurs, a current image is displayed in the first column of the screen (S1401). That is, images are arranged in the same order as in the list of images such that the current image is located in the first column. However, in a case where the list of images includes a small number of images, and thus the current image does not come in the first column, the image layout may be determined such that the current image is located as close to the left-hand edge of the multiple-image display screen as possible. In this determination of the image layout, positions of rows of images are not changed.

Next, a determination is performed as to whether the transition to the multiple-image display screen is from the date designation screen (S1402). In a case where the transition to the multiple-image display screen is from the date designation screen, the processing flow proceeds to S1403. However, in a case the transition to the multiple-image display screen is not from the date designation screen, the processing flow proceeds to S1406.

In S1403, a determination is performed as to whether an image shift operation is performed after the transition to the multiple-image display screen. In a case where an image shift operation is not detected even once, the processing flow proceeds to S1405. In S1405, the images of the designated date are displayed at a normal brightness, and images of dates other than the designated date are displayed at a lower brightness.

In a case where an image shift operation after the transition to the multiple-image display screen is detected, a determination is performed as to whether there is an image of the designated date in the screen area (S1404). In a case where there is an image of the designated date in the screen image groups 1203 and 1204 of dates other than the designated date are displayed at lower brightness than the normal brightness (S1405). On the other hand, in a case where there is no image of the designated date, the processing flow proceeds to S1406.

In S1406, all images are displayed at the normal brightness as with images 1202 illustrated in FIG. 12B.

That is, in the present embodiment, as in the first embodiment, when the screen is changed from the date designation screen to the multiple-image display screen, the image group of the designated date is displayed in a manner different from a manner in which the other image groups are displayed such that it is allowed to easily find a desired image. Furthermore, the above-described process according to the present embodiment may be executed by a small-sized computer program.

In the first embodiment described above, when even only one image shift operation is accepted, the state illustrated in FIG. 12A is released. Therefore, in a case where there are so many images of the designated date that the limited screen area does not allow all images of the designated date to be displayed therein, it becomes difficult to clearly indicate the range of images of the designated date. In the present embodiment, to avoid such a situation, as long as images of the designated date are displayed on the screen, the state illustrated in FIG. 12A is not released. This allows it to indicate a precise range of images of the designated date, and thus it is possible to easily find a desired image.

Fourth Embodiment

In the first embodiment described above, when the screen is changed from the date designation screen to the multiple-image display screen, a top image of a designated date is always displayed in the first column of the screen. However, in a fourth embodiment described below, the position where the top image of the designated date is changed depending on the number of images of the designated date.

The image processing apparatus according to the fourth embodiment is similar to the image processing apparatus according to the first embodiment in terms of the functional block (FIG. 1), the external appearance of the operation panel (FIGS. 2A and 2B), the processing flow in the images-in-card display mode (FIG. 3), and the manners of displaying images (FIGS. 5, 6, and 7), and thus a duplicated description thereof is not given.

Figure 15:
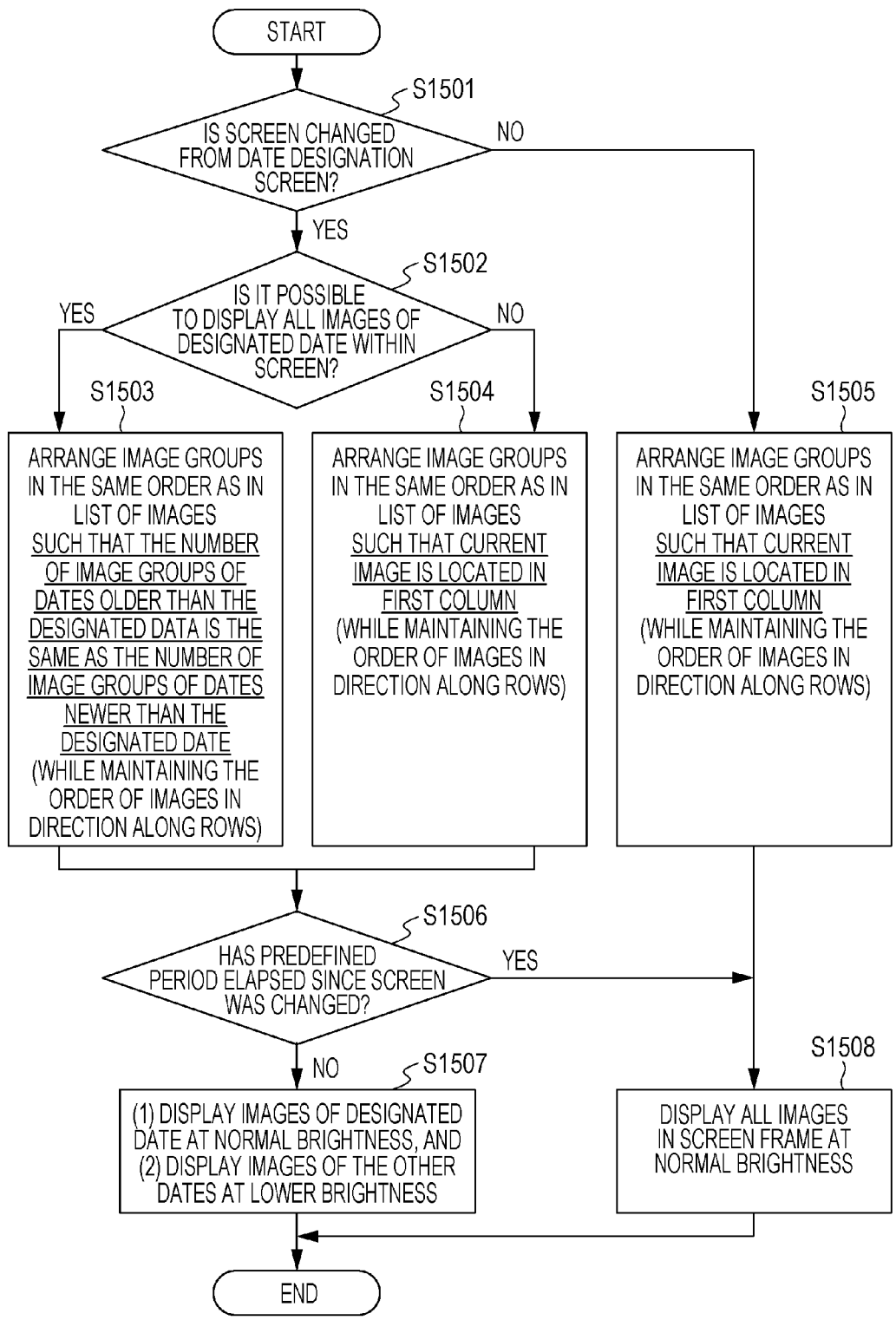
FIG. 15 is a flow chart illustrating details of a process associated with displaying a multiple-image display screen in an image processing apparatus according to an embodiment.
Figure 16A:
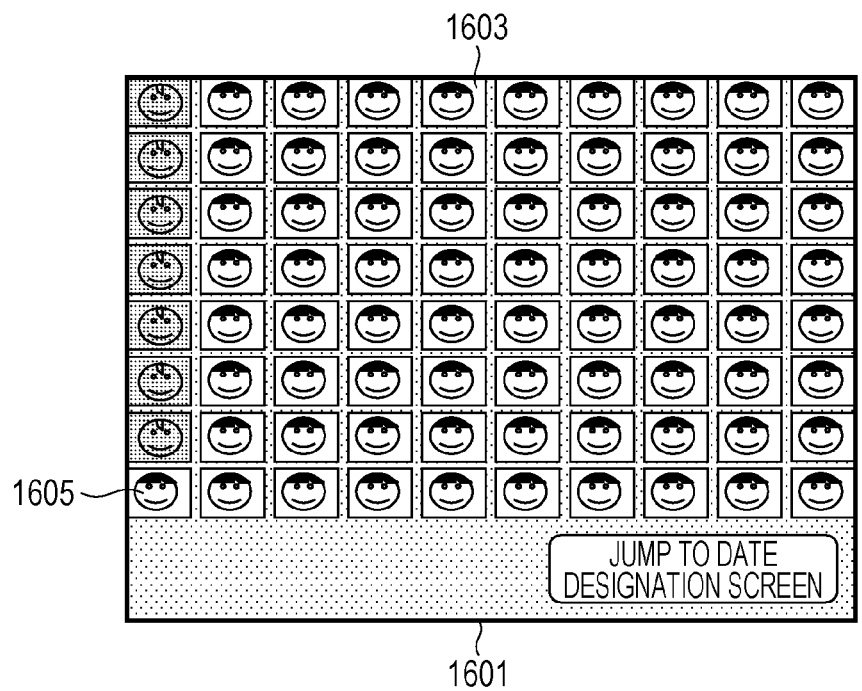
FIG. 16A is a diagram illustrating an example of a multiple-image display screen displayed in a mode in an image processing apparatus according to an embodiment.
Figure 16B:
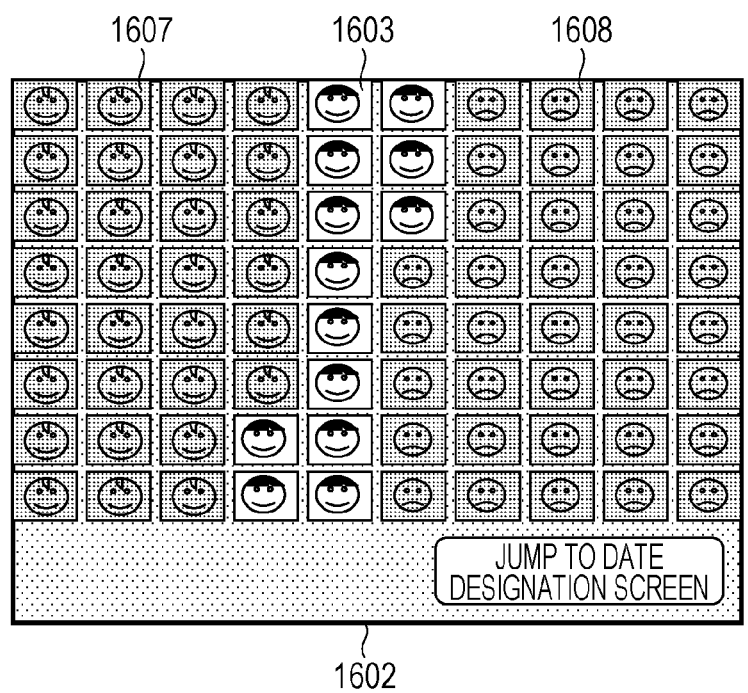
FIG. 16B is a diagram illustrating an example of the multiple-image display screen displayed in another mode.

Referring to FIG. 15 and FIGS. 16A and 16B, a description is given below as to a manner of displaying images in a multiple-image display screen according to the fourth embodiment. FIG. 15 is a flow chart illustrating details of a process of displaying images in the multiple-image display screen according to the fourth embodiment. FIGS. 16A and 16B illustrate examples of manners of displaying images after the screen is changed from the date designation screen to the multiple-image display screen.

First, when a transition to the multiple-image display screen occurs, a determination is performed as to whether the transition to the multiple-image display screen is from the date designation screen (S1501). In a case where the transition to the multiple-image display screen is from the date designation screen, the processing flow proceeds to S1502.

On the other hand, in a case the transition to the multiple-image display screen is not from the date designation screen, a current image is displayed in the first column of the screen as in the first embodiment (S1505). In this process, images are arranged in the same order as in the list of images such that the current image is located in the first column. However, in a case where the list of images includes a small number of images, and thus the current image does not come in the first column, the image layout may be determined such that the current image is located as close to the left-hand edge of the multiple-image display screen as possible. In this determination of the image layout, positions of rows of images are not changed.

In S1502, a determination is performed as to whether it is possible to display all images of an image group of the designated date within the screen. The following process is varied depending on whether all images of the image group of the designated date are allowed to be displayed. In a case where all images of the designated date are allowed to be displayed in the screen, images are rearranged according to the order of images in the list of images such that the number of images displayed in the multiple-image display screen 1602 is equal between an image group 1607 of a date older than the designated date and an image group 1607 of a date newer than the designated date as illustrated in FIG. 16B (S1503). That is, the images are rearranged such that the horizontal position of the image group of the designated date is located exactly or approximately at the center of the multiple-image display screen 1602. This makes it possible to display images of dates before and after the designated date, which allows a user to easily recognize images of the designated date and dates before and after that. Note that as illustrated in FIG. 16B, the number of columns before the designated date is not necessarily equal to that after the designated date. In a case where although all images of the image group of the designated date are allowed to be displayed, the images occupy a very large portion of the multiple-image display screen 1602, there is a possibility that only one of image groups, that is, either the image group 1607 of the date older than the designated date or the image group 1608 of the date newer than the designated date is allowed to be displayed. In this case, it may be set as required such that either the image group 1607 of the date older than the designated date or the image group 1608 of the date newer than the designated date is displayed. In S1503, positions of rows of images are not changed. Therefore, the current image is not necessarily located on the top of a column, but the current image may be located in the middle of the column as in a case illustrated in FIG. 16B. The processing flow then proceeds to S1506.

On the other hand, in a case where there are many images of the designated date and all images of the designated date are not allowed to be displayed in the screen, images are displayed such that a current image 1605, which is a top image of an image group 1603 of the designated date, is located in the first column as with the multiple-image display screen 1601 illustrated in FIG. 16A (S1504). In this image arrangement, positions of rows of images are not changed. The processing flow then proceeds to S1506.

In S1506, a determination is performed as to whether a predetermined period of time has elapsed since the transition to the multiple-image display screen. If the predetermined period of time has not yet elapsed, then, until the predetermined period of time has elapsed, only the image group 1603 of the designated date is displayed at the normal brightness, and the image group 1607 and the image group 1608 of the other dates are displayed at lower brightness (S1507). On the other hand, in a case where the predetermined period of time has elapsed since the transition to the multiple-image display screen, the processing flow proceeds to S1508, in which all images on the screen are displayed at the normal brightness (S1508).

That is, in the present embodiment, as in the first embodiment, when the screen is changed from the date designation screen to the multiple-image display screen, the image group of the designated date is displayed in a manner different from a manner in which the other image groups are displayed such that it is allowed to easily find a desired image. Furthermore, the above-described process according to the present embodiment may be executed by a small-sized computer program.

Furthermore, in the present embodiment, in the case where when the screen is changed from the date designation screen to the multiple-image display screen, if there are a large number of images of a designated date, the images of the designated date are arranged starting from the first column of the screen so that as many images of the designated date are displayed as possible. On the other hand, in the case where there are only a small number of images of a designated date, images of dates before and after the designated date are displayed in a well balanced manner as well as the images of the designated date. This allows a user to more easily find a desired image.

Fifth Embodiment

In the first to fourth embodiments described above, the multiple-image display screen has the fixed layout in which up to 80 images are allowed to be displayed. In a fifth embodiment described below, the multiple-image display screen has a plurality of layouts. When the screen is changed from the date designation screen to the multiple-image display screen, an optimum layout is automatically selected depending on the number of images of a designated date.

The image processing apparatus according to the third embodiment is similar to the image processing apparatus according to the first embodiment in terms of the functional block (FIG. 1), the external appearance of the operation panel (FIGS. 2A and 2B), the processing flow in the images-in-card display mode (FIG. 3), and the manners of displaying images (FIGS. 5 and 7), and thus a duplicated description thereof is not given.

Figure 17:
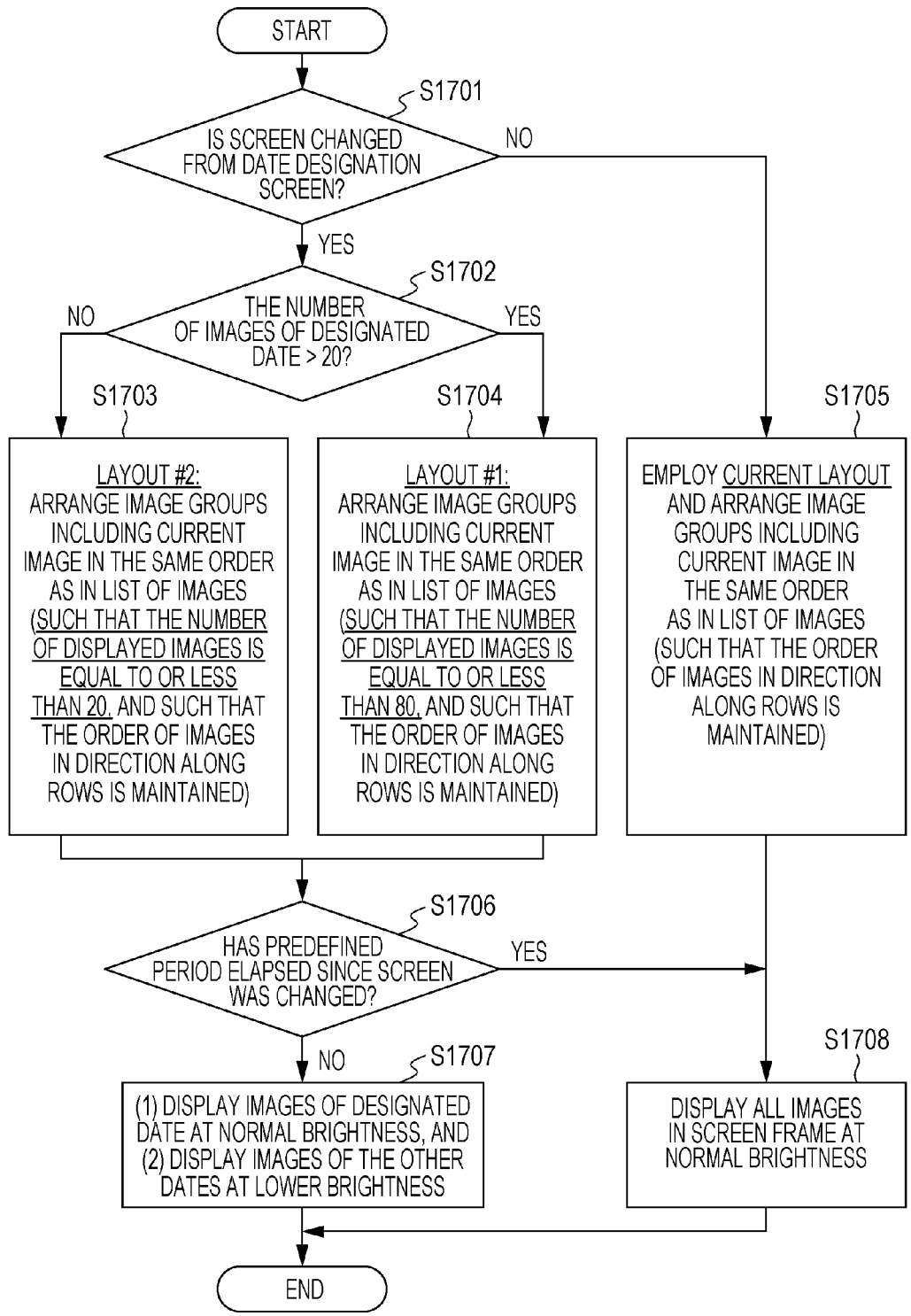
FIG. 17 is a flow chart illustrating details of a process associated with displaying a multiple-image display screen in an image processing apparatus according to an embodiment.
Figure 18A:
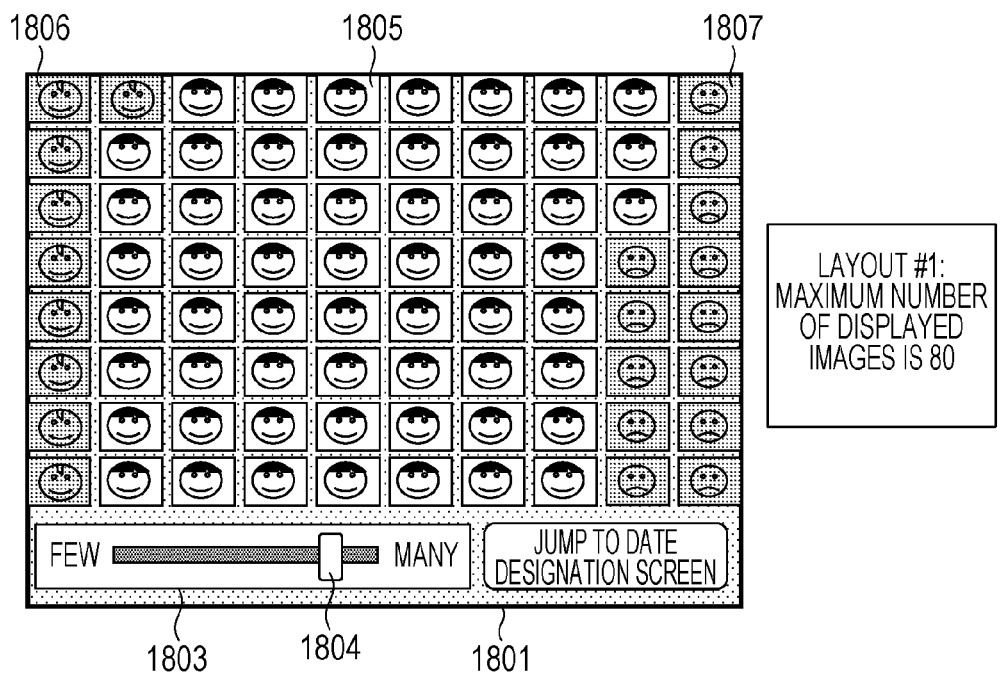
FIG. 18A is a diagram illustrating an example of a multiple-image display screen displayed in a mode in an image processing apparatus according to an embodiment.
Figure 18B:
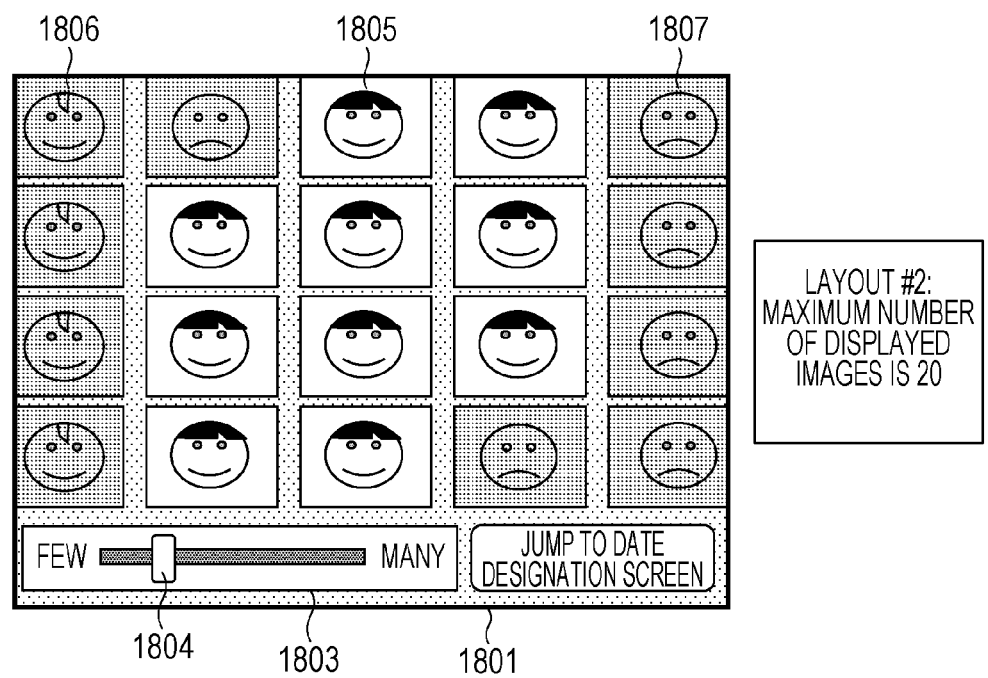
FIG. 18B is a diagram illustrating an example of the multiple-image display screen displayed in another mode.

Referring to FIG. 17 and FIGS. 18A and 18B, a description is given below as to a manner of displaying images in a multiple-image display screen according to the fifth embodiment. FIG. 17 a flow chart illustrating details of a process of displaying images in the multiple-image display screen according to the fourth embodiment. FIGS. 18A and 18B illustrate examples of manners of displaying images after the screen is changed from the date designation screen to the multiple-image display screen.

In FIGS. 18A and 18B, a multiple-image display screen 1801 includes a slide bar 1803 for use to change the number of displayed images, and a jump to date designation screen button. The slide bar 1803 includes a handle 1804 that is allowed to be operated by a user. When the user drags the handle 1804 with a finger in a horizontal direction, the number of displayed images is increased or decreased. For example, when the touch panel sensor 107 illustrated in FIG. 1 detects a movement of the handle 1804 to the right, the layout of the multiple-image display screen 1801 is switched such that a greater number of images are displayed. In FIG. 18A, a layout #1 is an example of such a layout in which up to 80 images are displayed. On the other hand, when the touch panel sensor 107 illustrated in FIG. 1 detects a movement of the handle 1804 to the left, the layout of the multiple-image display screen 1801 is switched such that a smaller number of images are displayed. In FIG. 18B, a layout #2 is an example of such a layout in which up to 20 images are displayed.

As described above, in the present embodiment, unlike the first to fourth embodiments, a user is allowed to switch the number of images displayed in the multiple-image display screen.

FIG. 17 illustrates a processing flow of displaying images when the screen is switched to the multiple-image display screen according to the present embodiment.

First, a determination is performed as to whether the transition to the multiple-image display screen is from the date designation screen (S1701). In a case where transition to the multiple-image display screen is not from the date designation screen, the processing flow proceeds to S1705.

On the other hand, in a case where transition to the multiple-image display screen is from the date designation screen, the processing flow proceeds to S1702. In S1702, a determination is performed as to whether the number of images included in an image group of a designated date is greater than a preset number of images allowed to be displayed in the multiple-image display screen. In the following explanation, by way of example, it is assumed that the layout #2 (the preset number of images is 20) is preset. That is, the determination is performed as to whether the number of images included in the image group of the designated date is greater than 20. In a case where the number of images included in the image set of the designated date is greater than 20, the processing flow proceeds to S1703, but otherwise the processing flow proceeds to S1704.

In S1703, images are displayed in the multiple-image display screen in the preset layout. That is, in the present embodiment, the image set including the current image is displayed in the layout #2 (in which up to 20 images are allowed to be displayed) in the same order as described in the list of images. In other words, as illustrated in FIG. 18B, the layout is automatically switched to the layout #2 (in which up to 20 images are allowed to be displayed), and images are displayed in the multiple-image display screen 1802. In this switching of the layout, positions of rows of images are not changed. The processing flow then proceeds to S1706.

In S1704, the multiple-image display screen is displayed in a layout that allows a greater number of images to be displayed than the preset number of images. In this situation, it may be desirable that the maximum allowable number of images displayed in the display screen is greater than the number of images included in the image group of the designated date. In the present embodiment, in S1704, the layout #1 (in which up to 80 images are allowed to be displayed) is selected and image sets including the current image are displayed in the same order as described in the list of images. In other words, as illustrated in FIG. 18A, the layout is automatically switched to the layout #1 (in which up to 80 images are allowed to be displayed), and images are displayed in the multiple-image display screen 1801. The processing flow then proceeds to S1706.

In S1705, image sets including the current image is displayed in a current layout screen in the same order as described in the list of images. In this layout, positions of rows of images are not changed. The processing flow then proceeds to S1708.

In S1706, a determination is performed as to whether a predetermined period of time has elapsed since the transition to the multiple-image display screen.

In a case where the predetermined period of time has not yet elapsed since the transition to the multiple-image display screen, only the image group 1805 of the designated date is displayed at the normal brightness, and the image group 1806 and the image group 1807 of the other dates are displayed at lower brightness (S1707). In this case, until the predetermined period of time has elapsed since the transition to the multiple-image display screen, only the image group 1805 of the designated date is displayed at the normal brightness, and the image group 1806 and the image group 1807 of the other dates are displayed at lower brightness. On the other hand, in a case where the predetermined period of time has elapsed since the transition to the multiple-image display screen, the processing flow proceeds to S1708.

In S1708, the current layout selected finally with the handle 1804 of the slide bar 1803 is maintained, and all images including the current image on the screen are displayed at the normal brightness.

That is, in the present embodiment, as in the first embodiment, when the screen is changed from the date designation screen to the multiple-image display screen, the image group of the designated date is displayed in a manner different from a manner in which the other image sets are displayed such that it is allowed to easily find a desired image. Furthermore, the above-described process according to the present embodiment may be executed by a small-sized computer program.

Furthermore, in the present embodiment, when the screen is changed from the date designation screen to the multiple-image display screen, a layout, which is optimum in terms of the maximum number of images, is automatically selected depending on the number of images of the designated date. This suppress a situation in which an unnecessarily large number of images are displayed. That is, in the present embodiment, it is allowed to reduce a situation in which an image group of a designated date is displayed only in a small portion of the multiple-image display screen, and thus it is allowed to find a desired image in a highly efficient manner.

Furthermore, in the present embodiment, the layout is switched according to an operation performed by a user. That is, the user is allowed to select a layout that is optimum for finding a desired image.

Sixth Embodiment

In the first to fifth embodiments, the touch panel sensor 107 is laminated on the liquid crystal display 106 to make it possible to detect a user's operation. In a sixth embodiment described below, a user's operation is detected via an arrow buttons and an OK button.

Figure 19:
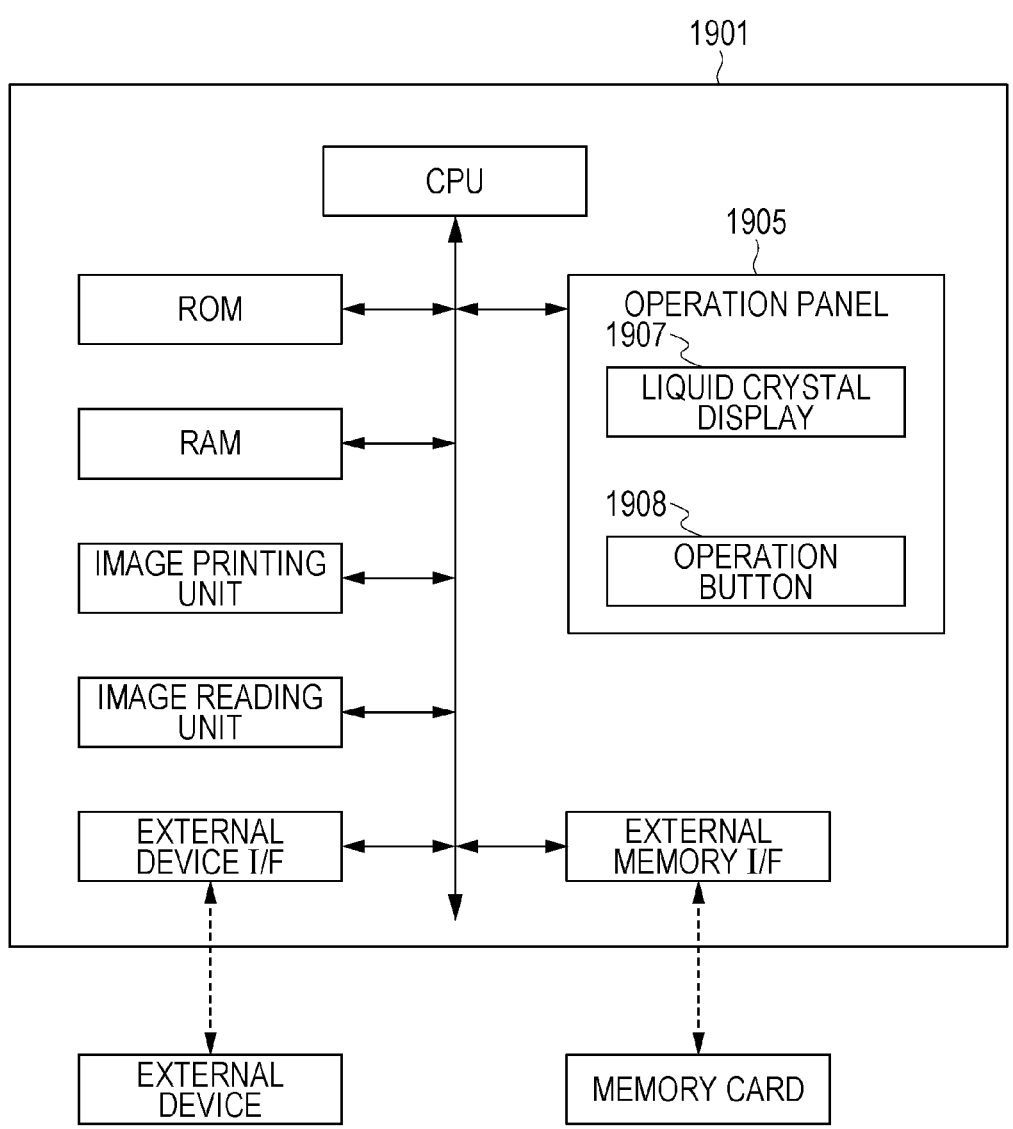
FIG. 19 is a function block diagram of an image processing apparatus according to an embodiment.

FIG. 19 is a function block diagram of an image processing apparatus according to the sixth embodiment. As illustrated in FIG. 19, the image processing apparatus 1901 includes a CPU, a ROM, a RAM, an image printing unit, an image reading unit, an external device I/F, an operation panel 1905, and an external memory I/F. The CPU, the ROM, the RAM, the image printing unit, the image reading unit, the external device I/F, and the external memory I/F are similar to those according to the first embodiment, and thus a further description thereof is omitted.

The operation panel 1905 includes a liquid crystal display 1907 and an operation button 1908.

Figure 20:
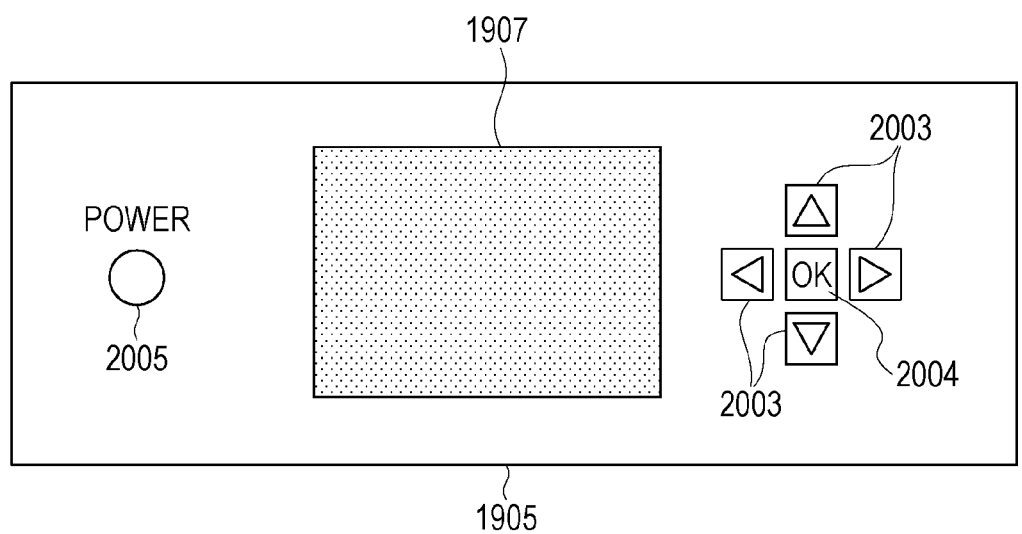
FIG. 20 is a schematic diagram illustrating an operation panel of an image processing apparatus according to an embodiment.

Referring to FIG. 20, the operation panel 1905 according to the present embodiment is described. FIG. 20 is a schematic diagram illustrating the operation panel 1905. As illustrated in FIG. 20, the operation panel 1905 includes a liquid crystal display 1907 and various operation buttons 1908 (including arrow buttons 2003, an OK button 2004, and a power button 2005). The power button 2005 is similar to the power button 108 according to the first embodiment, and thus a further description thereof is omitted.

Figure 21:
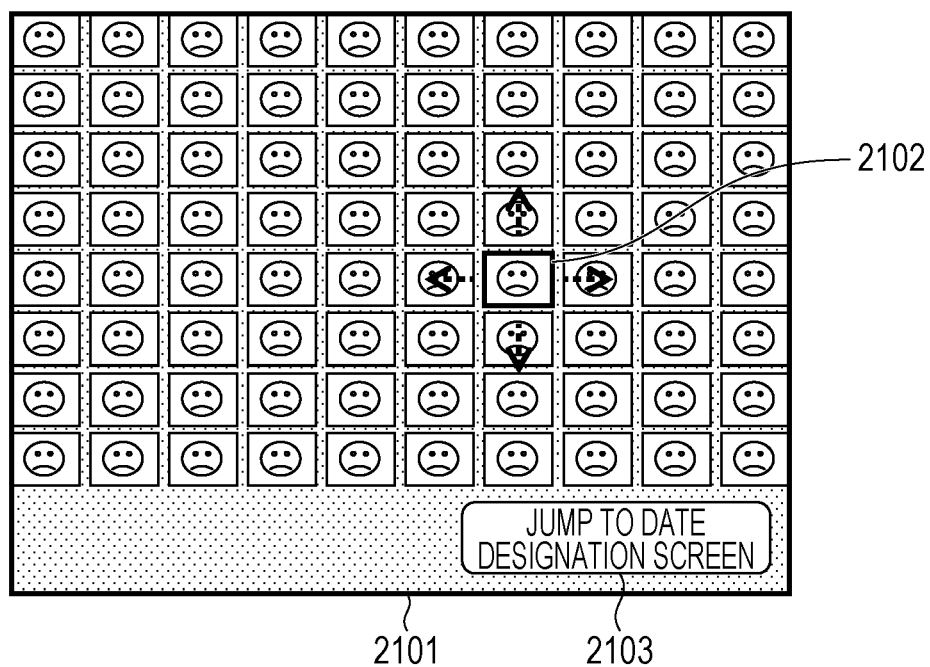
FIG. 21 is a schematic diagram illustrating an operation of a cursor in an image processing apparatus according to an embodiment.

Referring to FIG. 21, functions of the arrow buttons 2003 and the OK button 2004 are described. FIG. 21 is a diagram illustrating a manner of operating the arrow buttons 2003 and the OK button 2004.

As illustrated in FIG. 21, the multiple-image display screen 2101 includes a cursor 2102 for use in selecting an image, and a jump to date designation screen button 2103. In the first embodiment described above, an image is selected by tapping the image. Instead, in the present embodiment, a desired image is selected by moving the cursor 2102 on the screen onto the desired image using the arrow buttons 2003 and then pressing the OK button 2004. To press the jump to date designation screen button 2103 displayed below the multiple-image display screen 2101, the cursor 2102 is moved onto the jump to date designation screen button 2103 using the arrow buttons 2003 and then the OK button 2004 is pressed. Although not illustrated in figures, in the single-image display screen or the date designation screen, images or buttons on the screen may be selected by moving a cursor displayed on the screen using the arrow buttons 2003 and pressing the OK button 2004. The image shift operation in the single-image display screen is performed by pressing a right or left arrow button of the arrow buttons 2003. The image shift operation in the multiple-image display screen and the date designation screen is performed by moving the cursor to the right or left end of the screen and pressing the right or left arrow button of the arrow buttons 2003.

In the present embodiment, as in the first embodiment, the "images-in-card display mode" is provided. In this mode, displaying images is controlled in a similar manner as described above with reference to FIGS. 3 to 6.

That is, in the present embodiment, as in the first embodiment, when the screen is changed from the date designation screen to the multiple-image display screen, the image group of the designated date is displayed in a manner different from a manner in which the other image groups are displayed such that it is allowed to easily find a desired image. Furthermore, the above-described process according to the present embodiment may be executed by a small-sized computer program.

Furthermore, in the present embodiment, it is allowed to select an image without directly touching the screen of the operation panel 1905 (the liquid crystal display in the present embodiment). Therefore, even when the screen is small in size and thus it is not easy to correctly touch a point on the screen with a finger, the present embodiment allows it to easily select an image.

The present invention has been described above with reference to the embodiments. However, the present invention is not limited to details of those embodiments described above.

For example, in the embodiments described above, images are displayed such that an image group of a designated date is distinguishable from image groups of dates other than the designated date by lowering the brightness of the image groups of dates other than the designated date. However, the displaying method is not limited to that employed in the embodiments. For example, instead of changing the brightness, saturation or hue may be changed, or a combination of such parameters may be changed. Furthermore, instead of changing the manner of displaying images of dates other the designated dates, it may be allowed to change the manner of displaying the images of the designated date. Furthermore, the manner of displaying the image group of the designated date and the image groups of the other dates may both be changed from the normal mode. Furthermore, instead of changing the parameters (brightness, color, saturation, or the like) of images, additional information such as an icon, a character, a graphic pattern, a symbol, or the like may be superimposed on particular images or may be displayed close to the particular images.

In the embodiments described above, it is allowed to select an image even in the state in which the brightness is lowered for image groups of dates other than the designated date. Alternatively, the image selection may be disabled until the brightness for image groups of dates other than the designated date is returned to the normal value. Wrong operations may be prevented by disabling the image selection until the brightness for image sets of dates other than the designated date is returned to the normal value.

In the first to third embodiments, in the multiple-image display screen, a current image is located in the first column of the screen. However, the location of the current image is not limited to the first column. For example, the current image may be located in a second column, a central column, a last column in the screen, or at any other position properly selected.

In the fifth embodiment, it is assumed by way of example that two layouts are available. However, the number of layouts is not limited to two. It is allowed to user three or more layouts. Also in this case, displaying of images may be controlled in a similar manner as in the fifth embodiment. That is, an optimum layout may be automatically selected from two or more layouts. In the fifth embodiment, the layout is determined depending on whether the number of images of a designated date is greater or smaller than the maximum number of images that are set to be allowed to be displayed on the screen. However, the manner of the determination is not limited to this. For example, the layout may be determined based on a number equal to the maximum number of images of the screen minus numbers of images located in one or two (or other proper number of) columns at leftmost and rightmost locations of the screen such that images of dates before and after the designated date are displayed in one or two columns.

In the embodiments described above, dates are used as image information related to image data, and image data in an image list is grouped into a plurality of image groups according to dates so that a user is allowed to designate a date in the date designation screen. However, the image information is not limited to dates. For example, a particular unit such as a year, a month, a week, an hour, or the like may be employed, and image data in an image list may be grouped into a plurality of image sets according to the particular unit. In this case, images (image groups) of a designated unit may be displayed in a manner different from a manner of displaying images (image groups) of non-designated units.

In the embodiments described above, in the single-image display screen, the multiple-image display screen, and the date designation screen, the list of images is generated in order of date/time from the oldest to the latest. However, the order of the list of images is not limited to this. For example, the order may be from the latest to the oldest.

In the embodiments described above, in the multiple image display mode, images based on image data included in an image set are arranged in the order according to the date-time information. However, the order is not limited to this. For example, in a case where another kind of information is used as image information, the images may be arranged in the order according to this information.

In the embodiments described above, when images are arranged, positions of rows of images are not changed. Alternatively, positions of rows of images may be changed. For example, images may be rearranged such that a current image is located at the top of a current.

In the embodiments described above, images are displayed in such a manner that images stored in a memory card are read out and displayed. However, the manner of displaying images is not limited to this. The embodiments described above may be applied to many situations in which images are displayed. For example, images and associated date information stored in the external device 114 illustrated in FIG. 1 may be read out via the external device I/F 113 and may be displayed in a similar manner as described in one of the embodiments. In another example, a document set on the image reading unit 112 may be read, and resultant image data and associated date-time information indicating a date/time of reading the document may be stored in the RAM 104. The image data and the associated date-time information may be read out from the RAM 104 and displayed in a similar manner.

In the embodiments described above, it is assumed by way of example that the image processing apparatus includes the image printing unit of the ink-jet type. The type of the image printing unit is not limited to the ink-jet type, but many other types of image printing units such as an image printing unit using an electrophotographic method using toner as color materials may be employed.

In the embodiments described above, it is assumed by way of example that the image processing apparatus is configured to include the recording function (the printing function) and the reading function (the scanning function). However, the configuration of the image processing apparatus is not limited to this. For example, of these functions, the image processing apparatus may have only the recording function. Alternatively, the image processing apparatus may have a further function such as a facsimile function in addition to the recording function and the reading function.

In the embodiments described above, "recording" ("printing") is not limited to forming information having a meaning such as a character, a graphic pattern, or the like, but the "recording" may form information having no meaning. Furthermore, there is no restriction on whether or not the information recorded is visually perceptible by a person and there is no restriction on whether or not the information recorded is easily noticeable. The information recorded on a recording medium may include a wide variety of information such as an image, a pattern, a structure, and the like. A medium processed or structured into a particular form falls within the scope of the "information". The "recording medium" is not limited to paper which is widely used when recording is performed using a recording apparatus, but the recording medium may be of a wide variety of types that is capable of accepting ink, such as a cloth, a plastic film, a metal plate, glass, ceramics, resin, wood, leather, and the like. The "Ink" refers to a liquid capable of being applied to a storage medium to form an image, a pattern, or the like or to process a storage medium. The ink may include a liquid for processing ink (for example, a liquid that makes the color agent in the ink applied to a recording medium coagulated or insolubilized).

The embodiments described above allow it to realize an image processing apparatus, an image processing method, and a program, capable of allowing a user to easily find and select a desired image.

It does not necessarily need to realize all processes described above using software, but part or all of the processes may be realized using hardware.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-203094, filed Sep. 14, 2012, which is hereby incorporated by reference herein in its entirety.

What is claimed is:

1. An apparatus comprising:
at least one processor coupled to a memory, wherein the at least one processor controls:
an acquisition unit that acquires a plurality of pieces of image data;
a display control unit that causes a display to display a first screen that is for displaying selection objects each corresponding to a different one of a plurality of image groups that are generated by classifying the plurality of pieces of image data based on image information related to each of the plurality of pieces of image data, and a second screen that is for displaying a plurality of images based on the plurality of pieces of image data acquired by the acquisition unit; and
a detection unit that detects selection of a selection object from the selection objects displayed on the first screen,
wherein the display control unit causes the display to display the second screen in a case where the detection unit detects the selection of the selection object from the selection objects displayed on the first screen
wherein in a case where the second screen is displayed by the display, the display control unit causes the display to display newly, on the second screen, a first plurality of images based on at least more than one piece of image data included in an image group corresponding to the selection object selected on the first screen and a second plurality of images, including at least one image that is not displayed on the first screen, based on at least more than one piece of image data included in an image group corresponding to a selection object that is different from the selection object selected on the first screen, and
wherein the first plurality of images displayed on the second screen are displayed in a manner distinguishable from the second plurality of images displayed on the second screen.

2. The apparatus according to claim 1,
wherein the image information is date and time information, and
wherein the display control unit displays images on the second screen such that images based on the plurality of pieces of image data acquired by the acquisition unit are arranged in order of date and time information.

3. The apparatus according to claim 1,
wherein the display control unit causes the display to display images such that in a case where a predetermined period of time has elapsed since the selection of the selection object has been detected, the display control unit changes a displaying state in which the first plurality of images displayed on the second screen are displayed in the manner distinguishable from the second plurality of images displayed on the second screen to a displaying state in which the first plurality of images displayed on the second screen are displayed in the manner non-distinguishable from the second plurality of images displayed on the second screen.

4. The apparatus according to claim 1,
wherein a displaying state in which the first plurality of images displayed on the second screen are displayed in a manner distinguishable from the second plurality of images displayed on the second screen is not changed until all of the plurality of images have been displayed.

5. The apparatus according to claim 1, wherein the at least one processor further controls:
a second detection unit that detects an image change command for changing an image being displayed by a user instruction,
wherein in a case where the second detection unit detects the image change command, the display control unit changes a displaying state in which the first plurality of images displayed on the second screen are displayed in a manner distinguishable from the second plurality of images displayed on the second screen to a displaying state in which the first plurality of images displayed on the second screen are displayed in the manner non-distinguishable from the second plurality of images displayed on the second screen.

6. The apparatus according to claim 5,
wherein the image change command is a command to change an image being displayed, issued by sliding a displayed image in a particular direction, and
wherein the display control unit causes the display to display images on the second screen such that the displayed images are changed without changing the order of images in a direction perpendicular to the particular direction.

7. The apparatus according to claim 1,
wherein the display control unit does not change, until no more the first plurality of images are displayed, the displaying state in which the first plurality of images displayed on the second screen are displayed in the manner distinguishable from the second plurality of images displayed on the second screen to a displaying state in which the first plurality of images displayed on the second screen are displayed in the manner non-distinguishable from the second plurality of images displayed on the second screen.

8. The apparatus according to claim 1,
wherein the display control unit causes the display to display images such that the first plurality of images are displayed in a manner distinguishable from the second plurality of images by changing at least one of brightness, saturation, and hue of the images based on the image data.

9. The apparatus according to claim 1,
wherein the display control unit causes the display to display images such that the first plurality of images are displayed in the manner distinguishable from the second plurality of images by adding at least one or more of an icon, a symbol, and a graphic pattern to the images based on the image data or by displaying at least one or more of the icon, the symbol, and the graphic pattern in an area close to the images based on the image data.

10. The apparatus according to claim 1,
wherein the display control unit causes the display to display images on the second screen such that the first plurality of images displayed on one end side of an image display area, on the second screen, for displaying the plurality of images based on the plurality of pieces of image data acquired by the acquisition unit.

11. The apparatus according to claim 1,
wherein the display control unit causes the display to display images on the second screen such that a difference is minimized between the number of images displayed before the first plurality of images and the number of images displayed after the first plurality of images.

12. The apparatus according to claim 1,
wherein the display control unit causes the display to display images on the second screen such that the number of images displayed is changed depending on the number of pieces of the first plurality of images.

13. The apparatus according to claim 1, wherein the at least one processor further controls:
a printing unit that prints image data on a recording medium.

14. The apparatus according to claim 1,
wherein each of the images displayed on the first screen is an image based on a corresponding piece of image data included in the different one of the plurality of image groups.

15. The apparatus according to claim 1,
wherein the images displayed on the second screen are based on at least more than the plurality of pieces of image data acquired by the acquisition unit.

16. The apparatus according to claim 1,
wherein the selection objects include images and character strings.

17. The apparatus according to claim 16,
wherein the character strings each corresponding to a different one of the plurality of image groups are information displayed based on the image information.

18. The apparatus according to claim 16,
wherein the image information is date and time information, and
wherein each of the character strings is a character string indicating a date.

19. The apparatus according to claim 1,
wherein an object for changing the second screen to the first screen is displayed in the second screen, and the second screen is changed to the first screen if the object for changing the second screen to the first screen is selected.

20. A method comprising:
acquiring, at an apparatus, a plurality of pieces of image data;
causing, at the apparatus, a display to display a first screen that is for displaying selection objects each corresponding to a different one of a plurality of image groups that are generated by classifying the plurality of pieces of image data based on image information related to each of the plurality of pieces of image data, and a second screen that is for displaying a plurality of images based on the plurality of pieces of acquired image data; and
detecting, at the apparatus, selection of a selection object from the selection objects displayed on the first screen,
wherein the causing causes the display to display the second screen in a case where the detecting detects the selection of the selection object from the selection objects displayed on the first screen,
wherein in a case where the second screen is displayed by the display, the causing causes the display to display newly, on the second screen a first plurality of images based on at least more than one piece of image data included in an image group corresponding to the selection object selected on the first screen and a second plurality of images, including at least one image that is not displayed on the first screen, based on at least more than one piece of image data included in an image group corresponding to a selection object that is different from the selection object selected on the first screen, and
wherein each of the above processes are executed by more than one processor.

21. A non-transitory computer-readable recording medium configured to cause a computer to execute a method, the method comprising:
acquiring, at an apparatus, a plurality of pieces of image data;
causing, at the apparatus, a display to display a first screen that is for displaying selection objects each corresponding to a different one of the plurality of image groups that are generated by classifying the plurality of pieces of image data based on image information related to each of the plurality of pieces of image data, and a second screen that is for displaying a plurality of images based on the plurality of pieces of acquired image data; and
detecting, at the apparatus, selection of a selection object from the selection objects displayed on the first screen;
wherein the causing causes the display to display the second screen in a case where the detecting detects the selection of the selection object from the selection objects displayed on the first screen,
wherein in a case where the second screen is displayed by the display, the causing causes the display to display newly, on the second screen, a first plurality of a first plurality of images based on at least more than one piece of image data included in an image group corresponding to the selection object selected on the first screen and a second plurality of images, including at least one image that is not displayed on the first screen, based on at least more than one piece of image data included in an image group corresponding to a selection object that is different from the selection object selected on the first screen,
wherein the first plurality of images displayed on the second screen are displayed in a manner distinguishable from the second plurality of images displayed on the second screen, and
wherein each of the above processes are executed by more than one processor.

* * * * *